(12) United States Patent
Aleahmad et al.

(10) Patent No.: US 10,482,781 B2
(45) Date of Patent: Nov. 19, 2019

(54) ONLINE EDUCATION PLATFORM HAVING AN INSTRUCTOR DASHBOARD

(71) Applicant: COURSERA, INC., Mountain View, CA (US)

(72) Inventors: Turadg Aleahmad, San Francisco, CA (US); Amory B. Schlender, San Francisco, CA (US); Na Yeon Kim, Mountain View, CA (US); Pang Wei Koh, Palo Alto, CA (US); Roshan Rajesh Sumbaly, Milpitas, CA (US); Parth Hemant Upadhyay, San Francisco, CA (US); Dennis Karl Li, South San Francisco, CA (US); Colleen Chia-Yen Lee, Palo Alto, CA (US); Ankit Ahuja, Mountain View, CA (US)

(73) Assignee: COURSERA, INC., Mountain View, CA (US)

( * ) Notice: Subject to any disclaimer, the term of this patent is extended or adjusted under 35 U.S.C. 154(b) by 738 days.

(21) Appl. No.: 14/788,424

(22) Filed: Jun. 30, 2015

(65) Prior Publication Data

US 2017/0004721 A1    Jan. 5, 2017

(51) Int. Cl.
*G09B 7/02* (2006.01)
*G09B 5/02* (2006.01)

(52) U.S. Cl.
CPC ............. *G09B 7/02* (2013.01); *G09B 5/02* (2013.01)

(58) Field of Classification Search
CPC ... G09B 7/02; G09B 7/00; G09B 5/08; G09B 7/04; G09B 5/00; G09B 19/00; G06Q 50/20
See application file for complete search history.

(56) References Cited

U.S. PATENT DOCUMENTS

2001/0056460 A1  12/2001  Sahota et al.
2002/0019837 A1   2/2002  Balnaves
(Continued)

FOREIGN PATENT DOCUMENTS

WO    2012/068157 A2    5/2012

OTHER PUBLICATIONS

International Search Report and Written Opinion received for PCT Patent Application No. PCT/US2016/039836, dated Nov. 3, 2016, 10 pages.

*Primary Examiner* — Jerry-Daryl Fletcher
(74) *Attorney, Agent, or Firm* — Brake Hughes Bellermann LLP

(57) ABSTRACT

According to an aspect, an online education platform may be configured to provide an online course over a network to a plurality of computing devices. The online course may provide education content in which learners view and interact with the education content. The online education platform may include an online course analyzer to determine performance data associated with learners' engagement with the education content including an engagement metric indicating a level of engagement of the learners with the education content during a session of the online course, and provide the performance data via an instructor dashboard. The online course analyzer may include a content editor configured to edit the education content based on the performance data including changing at least a portion of the education content based on the performance data before a completion of the online course.

15 Claims, 25 Drawing Sheets

(56) References Cited

U.S. PATENT DOCUMENTS

| | | | |
|---|---|---|---|
| 2006/0168233 A1 | 7/2006 | Alcorn et al. | |
| 2007/0143664 A1 | 6/2007 | Fang et al. | |
| 2009/0226872 A1* | 9/2009 | Gunther | G09B 7/00 434/350 |
| 2010/0279264 A1 | 11/2010 | Barazanji | |
| 2014/0072945 A1 | 3/2014 | Gu et al. | |
| 2014/0335497 A1* | 11/2014 | Gal | G09B 7/00 434/323 |
| 2014/0335498 A1* | 11/2014 | Muthukumarasamy | G09B 7/00 434/350 |
| 2015/0099255 A1* | 4/2015 | Aslan | G09B 5/08 434/350 |
| 2017/0004720 A1 | 1/2017 | Ahuja et al. | |

\* cited by examiner

Authoring Tool 170

● ②
Edit    Review & Publish

Changes are saved as a draft but not published

Review & Publish — 421

Revert — 423

Readings

This title is a simple example of a heading on web

Now we're back to normal text, notice that you can insert math expressions inline: $x^2$. On the learner side it will render into a stylized match expression.
We can also create bold, *italic*, and underlined text using this authoring interface. Links are also possible: www.coursera.org.
There are even ways to insert list and tables:

1. Here is a numbered list
2. There are many things that this authoring interface can do.
- Bulleted lists are also possible.
Tables are also an interesting thing you can do in CML.

Here's the start of a table     Column 2     Column 3

You can type things inside like this

We also have stylized block that look like code.

```
private class CML {
    void convertToCML(String richText) {
        // Type code here
    }
}
```

Images are also possible.

coursera

Authoring Tool 170

● Edit
② Review & Publish

Readings

Changes are saved as a draft but not published

Review & Publish    Revert

This title is a simple example of a heading on web

Now we're back to normal text, notice that you can insert math expressions inline: $x^2$. On the learner side it will render into a stylized match expression.
We can also create bold, *italic*, and underlined text using this authoring interface. Links are also possible: www.coursera.org.
There are even ways to insert list and tables:

1. Here is a numbered list
2. There are many things that this authoring interface can do.
- Bulleted lists are also possible.
Tables are also an interesting thing you can do in CML.

| Here's the start of a table | Column 2 | Column 3 |
|---|---|---|
| | You can type things inside like this | |

We also have stylized blocks that look like code

```
private class CHL {
```

```
<div><ch1>This title is simple example of heading on web</h1><p>Now we're back to normal text. Notice that you can insert
Math expressions incline: <span class="MathJax_Preview"></span><span class="MathJax-Element-1-Frame" role="textbox"
aria-readonly="true"><nobr><span class="math" id="MathJax-Span-1"><span style="display: inline-block; position: relative; width:
17px; height: 0px; font-size: 120%;"><span style="position: absolute; clip: rect(19.9px 16800px 40.2px -9.5px); top: -37px;
left: 0px;"><span class="mrow" id="MathJax-Span-2"><span class="msubsup" id="MathJax-Span-3"><span style="display: inline-block;
position: relative; width: 16.1px; height: 0px;"><span style="position: absolute; clip: rect(32.6px 16800px 46.2px-9.5px); top;
-43px; left: 0px;"><span class="m1" id="MathJax-Span-4" style="font-family: STIXGeneral-Italic;">x<span style="display; inline-
block; overflow: hidden; height: 1px; width: 0.1px;"></span></span><span style="display: inline-block; width: 0px; height: 43px;">
</span></span><span style="position: absolute; top: -44.1px; left: 8.9px;"><span class="mn" id="MathJax-Span-5" style="font-size:
70.7%; font-family; STIXGeneral-Regular;">2</span></span><span style="display: inline-block; width: 0px; height: 38px;"></span><
span></span></span></span></span><span style="display: inline-block; width: 0px; height: 37px;"></span></span></span></span>
style=border-left-width: 0px; border-left-style: solid; display; inline-block; overflow: hidden; width: 0px; height: 16.3px;
vertical-align; -1.2px;"></span></nobr></span></span><script type="math/tex" id="MathJax-Element-1">x2</script>. On the learner
side it will render into a stylized math expression.</p><p>We can also create <strong>bold</strong>, <em>italic</em>, and <u>
underlinked</u> text using this authoring interface. Links are also possible: <a href="https://www.coursera.org"><www.coursera.org<
/a>.</p></u>there are even more ways to insert lists and tables.</p><ol><li>Here is a numbered list</li><li>There are many things that this authoring
interface can do. </li></ol></ul><li>Bulleted lists are also possible.</li></ul><p>tables are also an interesting thing you can do in CML.</
p><table><tbody><tr><td>Here's the start of a tables</td><td>Column 2</td><td>Column 3</td></tr><tr><td>
</td><td>you can type things inside like this</td><td><tr><td></td><td></td><td></td></tr></tbody></table><p>we also have stylized
blocks that look like code.</p><pre>private class cml {
    void converttoCML(String richText) {
        // Type code here
    }
}
</pre><p>Images are also possible.</p><figure>,img src="https://d3c33hcgiwev3.cloudfront.net/JxaXcg-
_EeWuoyIACxAAxQ_ae4f547412b218e6cafcf69670cf5db9_coursera-logo.png"></figure><p></p></div>
```

```
{
  "elements": [
    {
      "id": "9S1zHw-9EeWJFSIAC7Wjyw",  242
      "typeName": "cml",
      "definition": {
        "dtdId": "supplement/1",
        "value": "<co-content><heading level=\"1\">This title is a simple example of a heading on web</heading><text hasMath=\"true\">Now we're back to normal text. Notice that you can insert math expression inline: $$x~2$$. On the learner side it will render into a stylized math expression.</text><text>We can also create <strong>bold</strong>, <em>italic</em>, and <u>underlined</u> text using this authoring interface. Links are also possible: <a href=\"http://coursera.org</a>.</text><text> There are even ways to insert lists and tables:</text><list bulletType=\"numbers\"><li><text>Here is a numbered list</text></li></list><text> There are many things that this authoring interface can do.</text><li><li></list><list bulletType=\"bullets\"><li><text>Bulleted lists are also possible.</text></li></list><text> Tables are also an interesting thing you can do in CML.</text><table rows=\"3\" Columns=\"3\"><tr><td><text> Here's the start of a table </text><td><text><Column 2</text></td><td><text> Column 3</text></td><td><text/></td></tr><tr><td><text></text></td><td><text>You can type things inside like this</text></td><td><text/></td></tr><td><text></text></td><td><text></text></td><td><text></text></td></table><text>We also have stylized blocks that look like code.</text><code>Private class CML {\n void convertToCML (String richText) {\n    // Type code here\n }\n</code><text><image are also possible.</text><img assetId=\"JxaXcg-_EeWUoyIACxAAxQ\"alt=\"\"/><text/> </co-content>"
      }
    }
  ],
  "paging":null,
  "linked": null
}
```

FIG. 7

Native Mobile 207

X

This title is a simple example of a heading on web

Now we're back to normal text, notice that you can insert math expressions inline:

$x^2$

On the learner side it will render into a stylized math expression.

We can also create bold, *italic*, and underlined text using this authoring interface. Links are also possible: www.coursera.org.

There are even ways to insert list and tables:

1. Here is a numbered list
2. There are many things that this authoring interface can do.
   -Bulleted lists are also possible.

Tables are also an interesting thing you can do in CML.

FIG.8

Web 205

Now we're back to normal text, notice that you can insert math expressions inline: $x^2$. On the learner side it will render into a stylized match expression.
We can also create bold, *italic*, and underlined text using this authoring interface. Links are also possible: www.coursera.org.

There are even ways to insert list and tables:

1. Here is a numbered list
2. There are many things that this authoring interface can do.
- Bulleted lists are also possible.
Tables are also an interesting thing you can do in CML.

| Here's the start of a table | Column 2 | Column 3 |
|---|---|---|
| | You can type things inside like this | |

We also have stylized block that look like code.

```
private class CML {
    void convertToCML (String richText) {
        // Type code here
    }
}
```

Images are also possible.

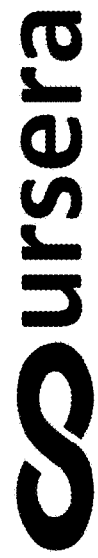

Authoring Tool 170

Question 1

VARIATION 1
Prompt

182

425

In the given figure, the cost function $$J(\theta_0,\theta_1)$$ has been plotted against $$\theta_0$$ and $$\theta_1$$, as shown in 'Plot 2'. The contour plot for the same cost function is given in 'Plot 1. Based on the figure, chose the correct options (check all that apply)

Plots for Cost Function $J(\theta_0,\theta_1)$

Plot 1        Plot 2

H1 H2 H3 B I U ∞ ≡ ≡ 🖼 ⊞ </>

Question Type    [Multiple correct answer ▼]

Options        ☐    Point P (the global minimum of plot 2) corresponds to point a of Plot 1.    X
✓ Shuffle option order
Correct. Plot 2 is a 3-D surface plot for cost function $$J(\theta_0,\theta_1)$$ against $$\theta_0$$ and $$\theta_1$$, whereas Plot 1 is the 2-D Contour plot for the same cost function. Hence, the correspondence of the two plots can be understood ☐    If we start from point B, gradient descent with a well-chosen learning    X
rate will eventually help us reach at or near point A, as the value of
cost function $$J(\theta_0,\theta_1)$$ is minimum at A.

Correct. Correct implementation of Gradient Descent Algorithm will
help us minimizing the cost function $$J(/theta_0,\theta_1)$$. Since
point A represents the global minimum of the cost function, gradient
descent should lead us to reach at or near point A.

Point P (The global minimum of plot 2) corresponds to point C of Plot 1.    X

Enter an explanation at why this caption is correct or incorrect

FIG.11

Authoring Tool 170

● — ② 
Edit — Review & Publish

Graded Quiz
Linear Regression with One Variable

Question 1

VARIATION 1 considers the problem of predicting how well a student does in her second year of college/university, given how well they did in their first year.

Specifically, let x be equal to the number of "A" grades (including A-, A and A+ grades) that a student receives in their first year of college (freshmen year). We would like to predict the value of y, which we define as the number of "A" grades they get in their second year (Sophome year).

Changes are saved as a draft but not published

451 — STATISTICS | EDIT QUIZ — 453

Review & Publish | Revert

182

80    % Passing Threshold
     4 out of 5 questions

ONLINE EDUCATION PLATFORM HAVING AN INSTRUCTOR DASHBOARD

BACKGROUND

An online education platform provides a system that delivers online courses to learners through network-connected devices. The online education platform may provide a mechanism to allow an educator to create educational content for a particular online educational course. In some examples, the online education platform provides a course builder in which the educator uses to create the educational content for the online educational course. However, in some examples, when creating an on-line course, creativity is often limited because the platform does not provide flexibility in adjusting and modifying the education content. Furthermore, the technical knowledge to implement certain changes is often beyond the technical expertise of the educators. As such, some conventional online education platforms are relatively rigid, uniform, and standard, which can hinder learning.

SUMMARY

According to an aspect, a system may include at least one processor, and a non-transitory computer-readable medium configured to store executable instructions that when executed by the at least one processor are configured to implement an online education platform configured to provide an online course over a network to a plurality of computing devices. The online course may provide education content in which learners view and interact with the education content. The online education platform may include an online course analyzer configured to provide an instructor dashboard on a computing device associated with an instructor of the online course. The online course analyzer may determine performance data associated with learners' engagement with the education content including an engagement metric indicating a level of engagement of the learners with the education content during a session of the online course. The online course analyzer may include a content editor configured to edit the education content based on the performance data including changing at least a portion of the education content based on the performance data before a completion of the online course.

The system may include one or more of the following features (or any combination thereof). In some examples, the content editor may interface with an authoring tool executing on the computing device associated with the instructor, where the authoring tool is integrated within the instructor dashboard such that the instructor can initiate an edit of the education content while viewing the performance data. The online course analyzer may include a learner tracking unit configured to track learners' interactions with the education content during the session of the online course, and the online course analyzer may be configured to determine the engagement metric based on the learners' interactions. The online course analyzer may include a grading unit configured to automatically grade assessments taken by the learners, and provide one or more grading metrics via the instructor dashboard based on the graded assessments. The online education platform may be configured to provide a first version of an assessment of the online course, and the content editor may be configured to change at least a portion of the first version of the assessment to create a second version of the assessment. The online course analyzer may include an assessment comparator configured to compare the first version of the assessment with the second version of the assessment, where the online course analyzer may be configured to provide results of the comparison via the instructor dashboard. The online course analyzer may include a content evaluator configured to evaluate a quality of the education content based on the performance data, where the online course analyzer includes an alerting unit configured to generate an alert based on a quality of at least a portion of the educational content being equal to or below a threshold value. The online education platform may be configured to provide the education content with a first feature, and the online education platform is configured to provide the education content with a second feature, where the online course analyzer may include a feature comparator configured to compare performance data having the first feature with performance data having the second feature determine which of the first feature or the second feature is better than the other. The online course analyzer may be configured to provide a histogram reflecting a grade distribution of an assessment of the online course. The online course analyzer may include a survey unit configured to provide a first survey to learners of an online class associated with a first school, and provide a second survey to learners of the online class associated with a second school, where the first survey is equivalent to the second survey, and the survey unit may be configured to compare results of the first survey to results of the second survey.

According to an aspect, a non-transitory computer-readable medium stores executable instructions that when executed by at least one processor are configured to implement an online education platform. The online education platform may be configured to provide an online course over a network to a plurality of computing devices. The online course may provide education content in which learners view and interact with the education content. The online education platform may be configured to determine performance data associated with learners' engagement with the education content including an engagement metric indicating a level of engagement of the learners with the education content during a session of the online course, and a grading metric associated with an assessment of the education content, provide an instructor dashboard on a computing device associated with an instructor of the online course, where the instructor dashboard provides the engagement metric and the grading metric, and the instructor dashboard provides a link to initiate an edit of the assessment in relation to at least one of the engagement metric and the grading metric, and provide an authoring tool upon activation of the link, where the authoring tool defines a text editor configured to receive a modification to education content that defines the assessment.

The non-transitory computer-readable medium may include one or more of the following features (or any combination thereof). The online education platform may be configured to track learners' interactions with the education content during the session of the online course and determine the engagement metric based on the learners' interactions. The online education platform may be configured to automatically grade the assessment taken by each of the learners who completed the assessment and provide the grading metric via the instructor dashboard based on the graded assessment. The online education platform may be configured to provide a first version of the assessment, change at least a portion of the first version of the assessment to create a second version of the assessment, compare the first version of the assessment with the second version of the assessment, and provide results of the comparison via the instructor dashboard. The online education platform may be configured to evaluate a quality of the education content based on the performance data, and generate an alert based on a quality of at least a portion of the educational content being equal to or below a threshold value. The online education platform may be configured to provide the education content with a first feature, provide the education content with a second feature, and compare performance data having the first feature with performance data having the second feature determine which of the first feature or the second feature is better than the other. In some examples, the online education platform may be configured to provide a histogram reflecting a grade distribution of the assessment.

According to an aspect, a method for implementing an online education platform that provides an online course over a network to a plurality of computing devices in which learners view and interact with education content of the online course may include determining, by at least one processor, performance data associated with learners' engagement with the education content including an engagement metric indicating a level of engagement of the learners with the education content during a session of the online course and a grading metric associated with an assessment of the education content, providing, by the at least one processor, an instructor dashboard on a computing device associated with an instructor of the online course, where the instructor dashboard provides the engagement metric and the grading metric, and the instructor dashboard provides a link to initiate an edit of the assessment in relation to at least one of the engagement metric and the grading metric, and providing, by the at least one processor, an authoring tool upon activation of the link, where the authoring tool defines a text editor configured to receive a modification to education content that defines the assessment.

The method may include one or more of the following features (or any combination thereof). The method may include tracking, by the at least one processor, learners' interactions with the education content during the session of the online course, and determining, by the at least one processor, the engagement metric based on the learners' interactions. The method may include automatically grading, by the at least one processor, the assessment taken by each of the learners who completed the assessment, and providing, by the at least one processor, the grading metric via the instructor dashboard based on the graded assessment. The method may include providing, by the at least one processor, the education content with a first feature, providing, by the at least one processor, the education content with a second feature, and comparing, by the at least one processor, performance data having the first feature with performance data having the second feature determine which of the first feature or the second feature is better than the other.

The details of one or more implementations are set forth in the accompa-nying drawings and the description below. Other features will be apparent from the description and drawings, and from the claims.

BRIEF DESCRIPTION OF THE DRAWINGS

FIG. 4 illustrates a screenshot of an authoring tool of an instructor application that allows the instructor to edit the education content according to an implementation.

FIG. 5 illustrates another screenshot of the authoring tool of the instructor application that allows the instructor to edit the education content according to an implementation.

FIG. 6 illustrates an example of hypertext markup language (HTML) as a first format according to an implementation.

FIG. 7 illustrates the education content provided by the instructor via the authoring tool, which has been converted to the EML format according to an implementation.

FIG. 8 illustrates an example of a screenshot of the education content rendered by the learner application implemented as a native mobile application according to an implementation.

FIG. 9 illustrates an example of a screenshot of the education content rendered by the learner application implemented as a web application according to an implementation FIG. 10 illustrates a screenshot of the authoring tool that allows the instructor to change the assessment in response to feedback according to an implementation.

FIG. 11 illustrates another screenshot of the authoring tool that allows the instructor to change the assessment in response to feedback according to an implementation.

FIG. 12 illustrates another screenshot of the authoring tool that allows the instructor to change the assessment in response to feedback according to an implementation.

FIG. 13 illustrates a screenshot of the instructor dashboard according to an implementation.

DETAILED DESCRIPTION

Figure 1:
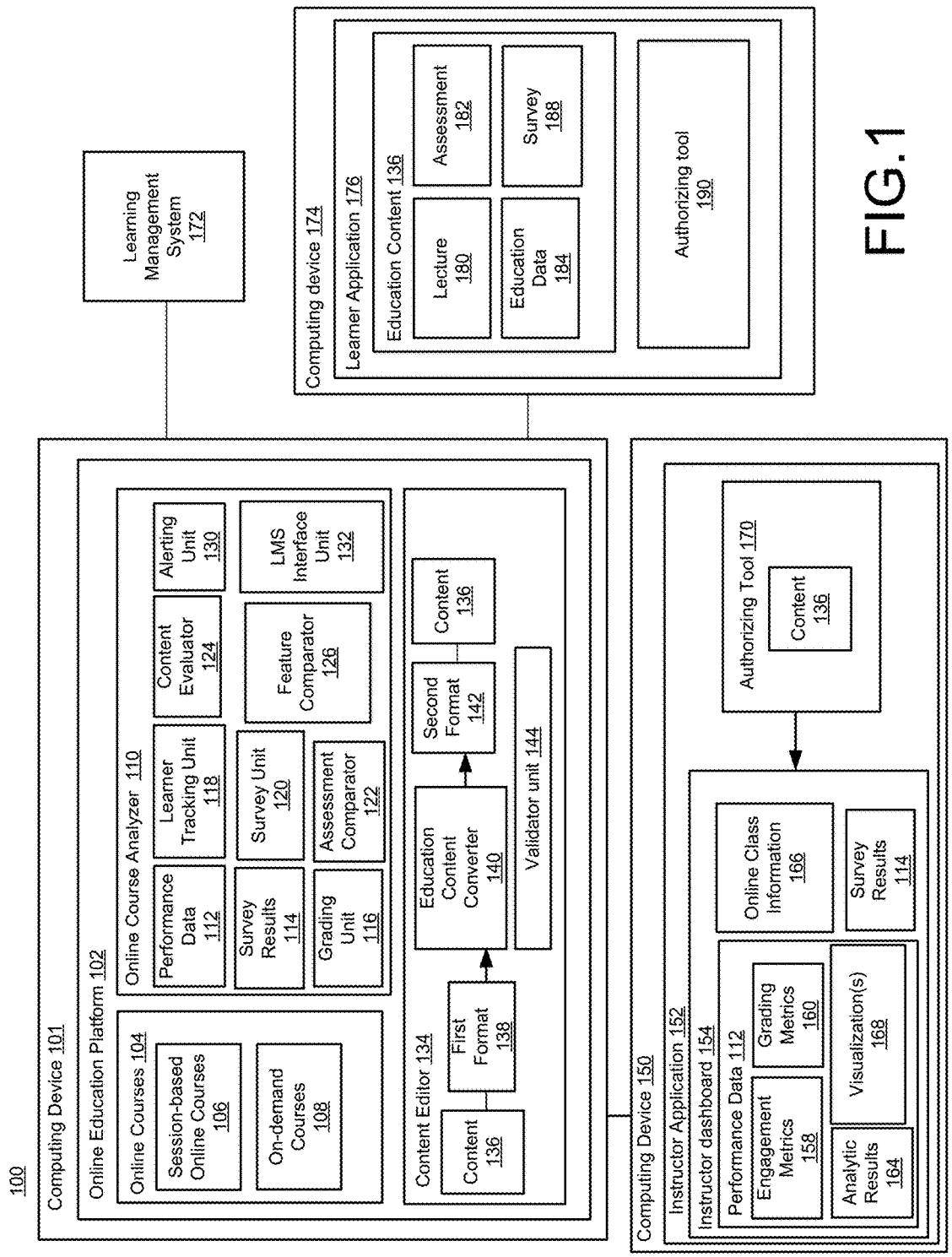
FIG. 1 is a schematic diagram of a system configured to support an online education platform according to an implementation.

FIG. 1 is a schematic diagram of a system 100 configured to support an online education platform 102 according to an implementation. The system 100 includes a computing device 101 configured to host the online education platform 102. The online education platform 102 may be configured to provide, over a network, online courses 104 to learners (students) via their computing devices 174. Referring to FIG. 1, the computing device 174 refers to a device used by a learner of an online course 104, and the learner uses his/her computing device 174 to connect to the online education platform 102 and receive education content 136 corresponding to the online course 104 from the online education platform 102. For instance, the online course 104 may specify the education content 136 that is delivered over the network to a learner application 176 of the computing device 174 in which a learner can view and interact with the education content 136.

The education content 136 may include a variety of information such as a lecture 180, an assessment 182 (e.g., quiz, test, assignment, etc.), education data 184 (e.g., text, audio, images, tables, math expressions, graphs, etc. for learning), and a survey 188. The lecture 180 may include one or more video and/or audio clips that correspond to a particular online course 104 (or a portion, module, or segment thereof). The online course 104 may specify a number of various lectures 180 that are viewed by the learners at different points in the timeline of the online course 104. The lecture 180 may define one or more user controls that allow the learner to control the lecture 180 and provide feedback to the online education platform 102. The assessment 182 may include one or more interactive questions to be answered by the learner via his/her computing device 174.

The education data 184 may include any type of visual information that is presented to the learner as part of the online course 104. For instance, the education data 184 may include one or more images, captions to the lecture 180, graphs, text, audio, or any other type of data that is presented to the learners, as well as interactive controls that permits the learners to comment and provide feedback regarding the education content 136. The survey 188 may include one or more survey questions that elicit feedback about the online course 104 from the learners. For example, the survey 188 may ask the learner to rate on a scale of 1 to 5 various topics relating to the online course 104. The survey 188 may be presented towards the end of the course, or may survey the learners at other parts of the online course 104 such as after completing an assessment 182 or watching/listening to a lecture 180.

The online education platform 102 may partner with universities, schools, and/or organizations to provide the online courses 104. In some examples, the online education platform 102 may provide hundreds or thousands of online courses 104 across many different types of universities, schools, or organizations, and each online course 104 may have hundreds of learners (e.g., hundreds of computing devices 174 connecting to a particular online course 104 via the online education platform 102). The online courses 104 may enable learners to watch short lectures, take interactive quizzes and peer-graded assessments, and connect with other learners and instructors. The online courses 104 may include session-based online courses 106 and on-demand courses 108. The session-based online courses 106 may be associated with a course schedule, and have specific start and end dates. Tests, if any, are taken according to the course schedule. The on-demand courses 108 are courses in which learners take on their own time, and guided by instructors to meet individual needs.

The online education platform 102 allows many learners to take a single online course 104, and, as a result, provides a level of statistical data that was not possible with conventional courses or with online education platforms having a smaller capacity. For instance, in a typically class, the number of learners may be around 30. However, with respect to a particular online course 104 provided by the online education platform 102, the number of learners may be over one hundred learners. In other examples, the number of learners for a single online course 104 may be over 300. As such, the large number of learners for a particular class permits the online education platform 102 to make certain types of classifications and analysis that was not possible with conventional courses or smaller online platforms, as further explained below.

The online education platform 102 may include an online course analyzer 110 configured to provide, over the network, an instructor dashboard 154 to be rendered by an instructor application 152 of a computing device 150. The online course analyzer 110 may be configured to provide, over the network, the instructor dashboard 154 that displays performance data 112 regarding the learner's interaction and/or performance with the education content 136, as well as any survey results 114. For instance, the instructor dashboard 154 may provide the instructor with the most relevant and interesting data regarding the online class's performance so that the instructor can make determinations on how well the learners are understanding the education content 136, and determine whether his/her online course 104 could benefit from any adjustments.

Also, the instructor dashboard 154 may display online class information 166 that provides background information about the learners of the online course 104 such as the number of learners enrolled in the online course 104, and information about each of the learners (e.g., name, school, etc.). Referring to FIG. 1, the computing device 150 refers to a device used by an instructor of an online course 104, and the instructor uses his/her computing device 150 to connect to the online education platform 102 to view the learners' performance and engagement via the instructor dashboard 154 and can make adjustments to the education content 136 via an authoring tool 170 that interacts with a content editor 134 which makes any instructor edits compatible with a format of the online education platform 102 such that the re-published education content 136 (reflecting the changed material) can be rendered across any implementation of the learner application 176 (e.g., native mobile, web, mobile web).

Generally, the online course analyzer 110 may be configured to analyze the learners' performance and feedback with respect to the education content 136, and provide statistical analysis on multiple different levels such as analyzing the quality of an assessment 182, comparing different versions of assessments 182, evaluating parts of the online course 104 having low/high engagements, analyzing overall performance of the learners, and/or marking characterizations about different groups of people, etc. In some examples, the instructor dashboard 154 may be a user interface (or series of user interfaces) that render the performance data 112, the online class information 166, and the survey results 114.

Generally, the performance data 112 may provide information about the learner's engagement and performance with the education content 136. The performance data 112 may indicate a level of learner engagement with various parts of the education content 136 of the online course 104 (e.g., number or percentage of students dropping off), and the grades (or scores) on the assessments 182. Furthermore, the performance data 112 may include analytic results 164 such as the number of students who completed the online course 104, the number of students who took an assessment 182, and the scores of the assessment(s) 182 by the individual learners, the online course 104 as a whole, or across multiple online courses 104. Then, based on this information, the instructor may use the authoring tool 170 to adjust the education content 136. For example, the instructor may see that a low percentage of learners correctly answer a question from the assessment 182. Then, while viewing this performance data 112, the instructor may start a process of altering the education content 136 (e.g., rewording a question from the assessment 182). In some examples, the authoring tool 170 may be integrated into the instructor dashboard 154 in a manner that allows the instructor to start an edit of an assessment 182 or change other parts of the education content 136 while viewing the performance data 112 (or other types of feedback) provided via the instructor dashboard 154, as further explained below.

In further detail, the online course analyzer 110 may include a learner tracking unit 118 configured to track the learners' engagements with the education content 136. In some examples, the learner tracking unit 118 may be configured to track each learner's clicks (or gestures) using the learner application 176. In some examples, the learner tracking unit 118 may be able to determine which learners are viewing and/or engaging with the education content 136 and which learners are not viewing and/or engaging with the education content 136. In some examples, the learner may be required to perform a certain action (e.g., selecting a control) while viewing the lecture 180 or interact with the education content 136 in a certain way. For instance, if the learner fails to perform one or more actions, the learner may be considered as not paying attention or dropped from the session or module of the online course 104.

The online course analyzer 110 may be configured to determine the performance data 112 associated with the learners' engagement with the education content 136 including one or more engagement metrics 158 indicating a level of engagement of the learners with the education content 178, over time, during a session of the online course 104. The one or more engagement metrics 158 may indicate a level of learner engagement over the course of the online course 104. In some examples, the engagement metrics 158 may indicate a percentage of the learners who viewed a particular lecture 180 (from the beginning to the end). In some examples, the online course analyzer 110 may be configured to determine the engagement metric(s) 158 based on the learners' tracked interactions or engagements as collected by the learner tracking unit 118.

Also, in some examples, the performance data may include one or more visualizations 168. For example, the engagement metrics 158 may be represented by one or more visualizations 168. The visualization(s) 168 may be a wave, chart, histogram, or any type of visual indicator indicating a level of learner engagement with the education content 136. For example, the visual indicator may change based on the level of learner engagement to reflect the level of attention/engagement with the online course 104. In one example, the wave (or histogram) may be larger for parts of the online course 104 having an increased rate of learner engagement (increased engagement metrics 158). In some examples, if the engagement metrics 158 are below (or above) a threshold value, the corresponding visualization 168 may be changed (e.g., displayed in red, bold, etc.). In some examples, the online course analyzer 110 is configured to continuously receive the relevant engagement metrics 158, and then populate the visualization 168 (and/or show the actual metrics) at intervals such as every 10 seconds, for example.

The online course analyzer 110 may include a grading unit 116 configured to automatically grade the assessment 182 taken by the learners. Then, the online course analyzer 110 may use the grading results to determine one or more grading metrics 160 associated with the assessment 182 (e.g., how many learners got question three right or wrong, etc.). The grading metrics 160 may be one or more values that represent the performance of the learners on one assessment 182 (or multiple assessments 182) across all the learners of the online course 104, certain subsets of learners, or individual learners. For example, the grading unit 116 may be configured to automatically grade the assessments 182 taken by the learners, and provide one or more grading metrics 160 via the instructor dashboard 154 based on the graded assessments 182. Also, the grading metrics 160 may be represented by one or more visualizations 168. For example, with respect to a particular assessment 182, the grading metrics 160 may specify the percentage of learners correctly answering each question.

The online education platform 102 may provide a first version of the assessment 182. Then, based on the performance data 112 (and potentially the survey results 114) provided via the instructor dashboard 154, the instructor may determine that a particular part of the online course 104 be changed. For instance, via the instructor dashboard 154, the instructor may see that the grading metrics 160 associated with a particular question on the assessment 182 is relatively low. Also, via the instructor dashboard 154, the instructor may see that the engagement metrics 158 for the lecture 180 and/or the education data 184 that relates to the subject matter of the low performing question are relatively low (e.g., a certain percentage of learners dropping off). Then, while viewing the engagement metrics 158 and/or the grading metrics 160, the instructor may institute a change to the education content 136, and the change may be carried out by the content editor 134 which converts the education content 136 having a first format (e.g., a textual or HTML format entered by the instructor on the user interface) to a second format 142 (e.g., education markup language (EML) format) that is compatible with the online education platform 102 such that the online education platform 102 can render the education content 136 with the second format 142 across any implementation of the learner application 176 (e.g., native mobile, web, mobile web). In some examples, the change is a modification to one of the questions, thereby creating a second version of the assessment 182. In other examples, the change is a modification to the lecture 180, or the education data 184 (e.g., the reading material or the practice questions).

The online course analyzer 110 may include an assessment comparator 122 configured to compare the first version of the assessment 182 with the second version of the assessment 182. The online course analyzer 110 may be configured to provide results of the comparison as analytic results 164 via the instructor dashboard 154. Also, it is noted that the analytic results 164 may also include any other types of analysis performed by the online course analyzer 110. In some examples, the assessment comparator 122 may be configured to compare the grading metrics 160 of the first version of the assessment 182 with the grading metrics 160 of the second version of the assessment 182, and determine the difference in the performance data 112 between the two different version, e.g., indicating whether there was an improvement in the scores relating to the previous low scoring question. As a result, the instructor can determine whether the changes to the assessment 182 created a positive change.

The online course analyzer 110 may include a survey unit 120 configured to provide the survey 188 to the learners of the online course 104. The survey 188 may include one or more survey questions that elicit feedback about the online course 104 from the learners. For example, the survey 188 may ask the learner to rate on a scale of 1 to 5 various topics relating to the online course 104. The survey 188 may be presented towards the end of the course, or may survey the learners at other parts of the online course 104 such as after completing an assessment 182 or watching a lecture 180. The survey unit 120 may be configured to collect the answers to the survey 188 and determine the survey results 114 to be provided to the instructor via the instructor dashboard 154.

In some examples, the survey unit 120 may provide a first survey to learners of an online course 104 associated with a first school, and provide a second survey to learners of the online course 104 associated with a second school, where the first survey is equivalent to the second survey. For example, the online education platform 102 may provide the same online course 104 to students of multiple schools. The survey unit 120 may provide the same survey 188 (e.g., a survey identifying the same questions) across the different schools, and then compare the results of the first survey to results of the second survey.

The online education platform 102 may include a content evaluator 124 configured to evaluate a quality of the education content 136 based on the performance data 112 including the engagement metric(s) 158, the analytic results 164, the grading metric(s) 160, and survey results 114. For example, the content evaluator 124 may evaluate various parts of the education content 136 based on the engagements metrics 158, the grading metrics 160, and the survey results 114. For example, the content evaluator 124 may determine that a grading metric(s) 160 for a particular assessment 182 (or portion of the assessment 182) is equal to or below a threshold value, an engagement metric 158(s) for a particular part of the lecture and/or the education data 184 that corresponds to the subject matter for the assessment 182 (or portion thereof) is below or equal to a threshold value, and/or the survey results 114 about the online course 104 (or portion thereof) indicates a relatively low score. Then, the content evaluator 124 may identify a portion of the online course 104 as potentially being low quality or a portion that potentially needs further improvement. In some examples, the content evaluator 124 may use a weighted scoring algorithm that assigns weights to various pieces of the performance data 112 and/or the survey results 114, and computes a score for different parts or segments of the education content 136. If the score is above (or above) a certain value, the content evaluator 124 may identify that part or segment of the education content 136 as low quality (or high quality).

The online education platform 102 may include an alerting unit 130 configured to generate an alert based on the quality of at least a portion of the educational content 136 being equal to or below a threshold value. For example, if the content evaluator 124 determines that a particular question of the assessment 182 is lower quality, the alerting unit 130 may be configured to generate an alert to the instructor. In some examples, the alerting unit 130 may be configured to provide the alert on an area of the instructor dashboard 154. In other examples, the alerting unit 130 may be configured to send an email or text to the instructor.

In some examples, the online education platform 102 may include a feature comparator 126 configured to compare two or more features in order to determine which feature is better than the others in terms of the performance data 112 and the survey results 114. In some examples, the feature comparator 126 is configured to perform A/B testing in view of the performance data 112 to determine which of the features (e.g., feature A or feature B) is better than the other. For example, the feature comparator 126 may be configured to compare two different versions or features of a particular aspect of the online course 104.

In further detail, the online education platform 102 may be configured to provide the education content 136 with a first feature for an online course 104, and the online education platform 102 is configured to provide the education content 136 with a second feature for an online course 104. The first feature may be different than the second feature. In some examples, the second feature is the opposite of the first feature. In one example, the first feature relates to providing a video of the instructor in relation to the lecture 180, and the second feature does not provide a video of the instructor (just the audio). In some examples, the online education platform 102 may provide the education content 136 having the first feature to a first group within the online course 104, and provide the education content 136 having the second feature to a second group within the online course 104 (e.g., the second group relates to a different set of learners than the first group). In other examples, the education content 136 having the first feature may be presented to a different session of the online course (e.g., same subject matter but different group of learners) than the education content 136 having the second feature. The feature comparator 126 may compare the performance data 112 and the survey results 114 of the education content 136 having the first features with the performance data 112 and the survey results 114 of the education content 136 having the second feature in order to determine which of the first feature or the second feature is better than the other.

The online course analyzer 110 may include a learning management system (LMS) interface unit 132 configured to interface, over the network, with an LMS 172 associated with an organization. For example, the LMS 172 may be associated with a particular school or university, and the LMS 172 provides the administration, documentation, tracking, reporting, and delivery of electronic education technology education courses or training programs associated with that school or university. An LMS 172 may include systems for managing training and education records and systems for distributing online or blended/hybrid courses over the network with features for online collaboration. The LMS interface unit 132 may be configured to communicate, over the network, with an organization's LMS 172 in order to transmit and receive information regarding learners who are part of the LMS's school as well as the online education platform 102.

For example, there may be a group of students at school A (school A having the LMS 172) who take an online course 104 provided by the online education platform 102. These students of school A take the online course 104 along with other learners (e.g., not part of school A). The online course analyzer 110 may determine the performance data 112 and the survey results 114 for all the learners of the online course 104 in the same manner described below. In some examples, the LMS interface unit 132 may be able to collect the performance data 112 and the survey results 114 for the students of school A, and send this information, over the network, to school A's LMS 172. In addition, the LMS interface unit 132 may be able to send analytic results 164 indicating how that group of students performed relative to other students of the online course 104 provided by the online education platform 102 or another group of students associated with school B. Also, it is noted that the LMS interface unit 132 may be configured to interface with a number of LMSs 172, where each LMS 172 relates to a different organization.

An instructor may develop or modify an online course 104 using the authoring tool 170. In some examples, the instructor may develop or modify the assessment 182 by adding, deleting, or changing the content for the questions and answers of the assessment 182 using the instructor dashboard 154 and/or the authoring tool 170. While viewing the engagement metrics 158, the grading metrics 160, the survey results 114, and/or the analytic results 164, the instructor may institute a change to the education content 136. For instance, the authoring tool 170 may be integrated into the instructor dashboard 154 such that the instructor can initiate an edit of the education content 136 while viewing the performance data 112 and the survey results 114. In other words, the instructor may not need to log into a separate system or navigate a different part of the online education platform 102. Rather, the instructor may activate a link, tab, control, button, etc. on the same user interface that provides the performance data 112 and/or the survey results 114, and this activation causes the online education platform 102 to provide a user interface (or series of user interfaces) that a part of the authoring tool 170, which allows the instructor to change (add, delete, or modify) various parts of the education content 136 including any quiz material.

The content editor 134 may interface with the authoring tool 170 to edit or develop the education content 136 based on the performance data 112 (and potentially the survey results 114 including changing at least a portion of the education content 136 based on the performance data 112. In some examples, the change can be published before a completion of the online course 104. The authoring tool 170 may define a user interface (or series of user interfaces) that allows the instructor to edit the education content 136. In some examples, the user interface of the authoring tool 170 may identify one or more text boxes for describing the question and one or more text boxes for providing possible answers (e.g., multiple choice questions). The instructor may create or edit a question by typing text with or without a limited set of stylized features (e.g., underlying, bolding, strike-through, etc.), and inserting and/or defining math expressions, headers, images, videos, audio files, tables, lists, hyperlinks, and/or code blocks. In some examples, the text boxes of the user interface of the authorizing tool 170 may provide a tool bar that lists a plurality of tools such as inserting tables, inserting math expressions, inserting a header, underline, strike-through, and/or bold, etc.

In some examples, the authoring tool 170 may function as a document editor that allows the instructor to create the education content 136 for the assessment 182 as he/she wants the learners to view the material. In some examples, the authoring tool 170 may indicate only the type of features permitted by the second format 142. As explained later in the specification, the education content 136 is eventually converted to the second format 142, which may be a restricted set of XML tags (or blocks having a limited set of attributes). As such, the authoring tool 170 may specify the type of editing features that is consummate in scope with the restricted scope of the second format 142. For example, the authoring tool 170 may not permit the recitation of a hyperlink to an audio file external to the online education platform 102 because this type of feature is not supported by the second format 142.

The content editor 134 may receive a modification to the education content 136 (e.g., adding, deleting, or changing the assessment 182) in the first format 138. The first format 138 may be a textual format specifying text (letters, numbers, and/or symbols without or within stylized features), math expressions, images, videos, audio files, tables, lists, hyperlinks, and/or code blocks or HTML. In some examples, the first format 138 is the HTML format.

The content editor 134 may include an education content converter 140 configured to convert the education content 136 having the first format 138 to education content 136 having the second format 142. In some examples, the second format 142 is considered a special education markup language that can operate with the end client to render education content (especially quizzes) with relatively good quality. For instance, on some platforms (e.g., mobile web), standard HTML tags do not render well when rendering special types of data such as the assessments 162. However, the education content 136 with the second format 142 is rendered with good design quality and uniform look and feel regardless of the type of end client or platform (e.g., across mobile web, native mobile application, or standard HTML web). Because the content editor 134 converts from the first format 138 to the second format 142, the instructor is unburdened with having to know the layout (or presentation details) of a particular platform (rather the layout is handled by the end client), and, therefore, the instructor can focus on the meaning of the content. For instance, the instructor can create the content using the text editor without having to know the details of HTML or whether certain data can cause security concerns. Also, the use of the second format 142 improves the functioning of the online education platform 102 itself because it improves the functioning and/or speed of populating changes within the online education platform 102. Furthermore, it lessens the security concerns associated with having many instructors insert content into the online education platform 102 by restricting the types of content that can be manipulated by the instructors.

In some examples, the second format 142 is a restricted XML format. For example, the restricted XML format may define the types of content permitted on the online education platform 102. In some examples, the restricted XML format may define a number of content types less than what is traditionally provided with XML or HTML. In other examples, the second format 142 is a restricted HTML format. In some examples, the restricted HTML format may define a number of HTML tags that are less than what is traditionally provided by HTML. In some examples, the restricted XML or HTML format is defined in terms of blocks, where each block relates to a different type of content (e.g., text block, table block, audio block, list block, etc.). Also, each block is associated with a limited set of attributes. Stated another way, the XML or HTML tags are defined with a limited set of attributes. In one example, the text block may specify text in terms of letters, numbers, and systems, and may include math expressions with a limited set of stylized features such as underlined, strikethrough, bold, etc. However, with respect to the text block, other features may be excluded such as double strikethrough.

The content editor 134 may include a validation unit 144 configured to validate that the education content 136 is suitable for conversion by the education content converter 140. In some examples, the validation unit 144 may perform a formality check on the education content 136 such that the education content 136 has the appropriate language to be converted. For instance, the authoring tool 170 may specify the insertion of a math expression using certain attributes, and, if the wrong attributes are used, the validation unit 144 may notify the instructor to use the correct the attributes. After the education content 136 is validated and converted, the updated education content 136 may be provided to the learner application 176 of the computing device 174.

The learner application 176 may be configured to communicate with the online education platform 102 over the network, and render and interact with the education content 136 provided by the online course 104. The learner application 176 may be a native application (including native mobile) or a browser-based application (mobile browser, or non-mobile browser) executing on an operating system of the computing device 174. The browser-based application may be referred to as mobile web or web. The learner application 176 may provide the education content 136 via an interface allows a learner to interact with the online education platform 102. The computing device 174 may be a mobile computing device (e.g., a smart phone, a PDA, a tablet, or a laptop computer) or a non-mobile computing device (e.g., a desktop computing device). The computing device 174 also includes various network interface circuitry, such as for example, a mobile network interface through which the computing device 174 can communicate with a cellular network, a Wi-Fi network interface with which the computing device 174 can communicate with a Wi-Fi base station, a Bluetooth network interface with which the computing device 174 can communicate with other Bluetooth devices, and/or an Ethernet connection or other wired connection that enables the computing device 174 to access the network.

In some examples, the learner application 176 also defines an authoring tool 190 that permits a learner to add material to the education content 136. In some examples, the authoring tool 190 operates in the same manner as the authoring tool 190. However, instead of editing quizzes and viewing performance information (which are actions typically performed by instructors), the learners may add content such as project material, reading material, and/or other types of data. The content editor 134 may receive the learner's content in the first format 138, and the education content converter 140 may convert the content to the second format 142 in the same manner described above.

The instructor application 152 may be configured to communicate with the online education platform 102 over the network. In some examples, the instructor application 152 is different than the learner application 176. In other examples, the instructor application 152 is the same or substantially the same as the learner application 176 except that the instructor application 152 includes additional functionality associated with instructors (e.g., providing an instructor dashboard 154 integrated with the authoring tool 170). For instance, a user may log into the online education platform 102, and if the user has been identified as an instructor, the online education platform 102 may provide the functionalities described with respect to the computing device 150. On the other hand, if the user has been identified as a learner, the online education platform 102 may provide the functionalities described with respect to the computing device 174. The instructor application 152 may render the instructor dashboard 154 and the integrated authoring tool 170. The instructor application 152 may be a native application or a browser-based application executing on an operating system of the computing device 150.

The computing device 150 may be a mobile computing device (e.g., a smart phone, a PDA, a tablet, or a laptop computer) or a non-mobile computing device (e.g., a desktop computing device). The computing device 150 also includes various network interface circuitry, such as for example, a mobile network interface through which the computing device 150 can communicate with a cellular network, a Wi-Fi network interface with which the computing device 150 can communicate with a Wi-Fi base station, a Bluetooth network interface with which the computing device 150 can communicate with other Bluetooth devices, and/or an Ethernet connection or other wired connection that enables the computing device 150 to access the network.

In some examples, the online education platform 102 may be considered a cloud-based online education service such that all or most of its main functionalities are executed on the computing device 101. For instance, the computing device 174 or the computing device 150 may access the online education platform 102 via the network through the use of any type of network connections and/or application programming interfaces (APIs) in a manner that permits the online education platform 102, the learner application 176, and the instructor application 152 to communicate with each other. In this regard, the term "cloud" or "cloud-aware" references the use of "cloud computing," which, generally speaking, includes a style of computing in which computing resources such as application programs and file storage are remotely provided over the network such as the Internet, typically through a web browser. For example, many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the computing device 101 may also represent an example of cloud computing. In other examples, a portion of the features of the online education platform 102 may be incorporated into the learner application 176 or the instructor application 152 executing locally on the computing device 174 or the computing device 150.

In some examples, the computing device 101 may include one or more servers. In some examples, the computing device 101 may include one or more processors (e.g., a processor coupled to a substrate), and a non-transitory computer-readable medium including executable instructions that when executed by the one or more processors are configured to implement the functionalities of the online education platform 102.

Figure 2:
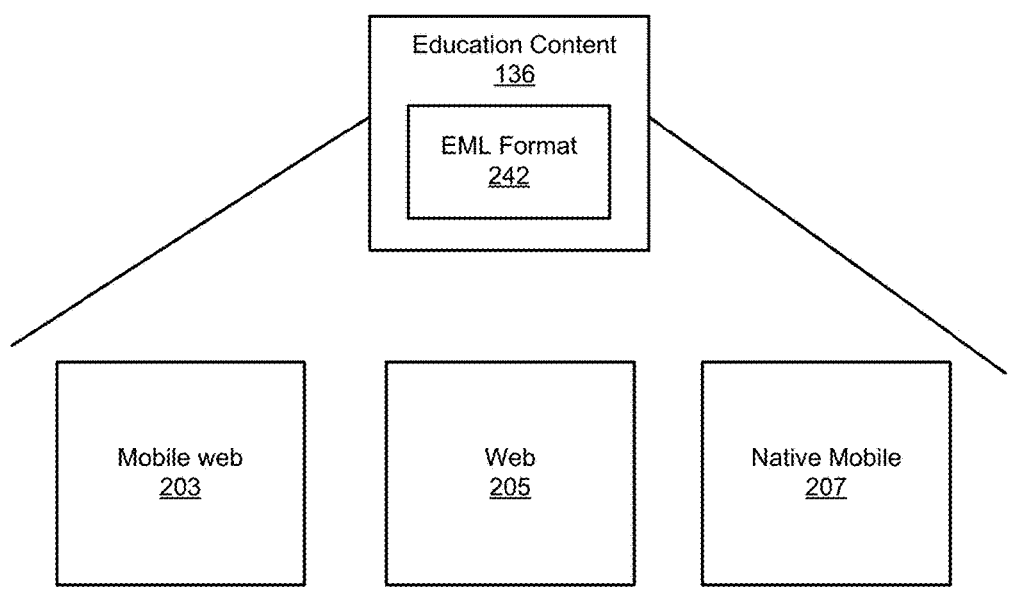
FIG. 2 illustrates education content that is operable across multiple implementations of a learner application of FIG. 1 according to an implementation.

FIG. 2 illustrates the education content 136 that is operable across multiple platforms of the learner application 176 according to an implementation. In some examples, the second format 142 is an education markup language (EML) format 242. The education content 136 having the EML format 242 is capable of being rendered across the learner application 176 implemented as a mobile web 203, a web 205, or native mobile 207. The mobile web 203 refers to access to the online education platform 102 through the use of a browser on a mobile phone (e.g., mobile browser) that display the education content 136 as a webpage. The web 205 refers to access to the online education platform 102 through the use of a non-mobile browser that displays the education content 136 as a webpage. The native mobile 207 may refer to a native application installed on a mobile. Typically, the education content 136 created by the instructors is either plain text or HTML (e.g., the education content 136 in the first format 138). However, the HTML tags for the assessments 182 do not render well (or properly) on the mobile web 203. For instance, with respect to certain types of data like the assessments 182 and other types of education data 184, presentation quality may be less than optimal on certain types of clients (e.g., mobile web 203) if there were no such conversion to the EML format 242. Therefore, according to the embodiments, the education content converter 140 converts the education content 136 having the first format 138 (e.g., the HTML) to education content 136 having the EML format 242.

Figure 3:
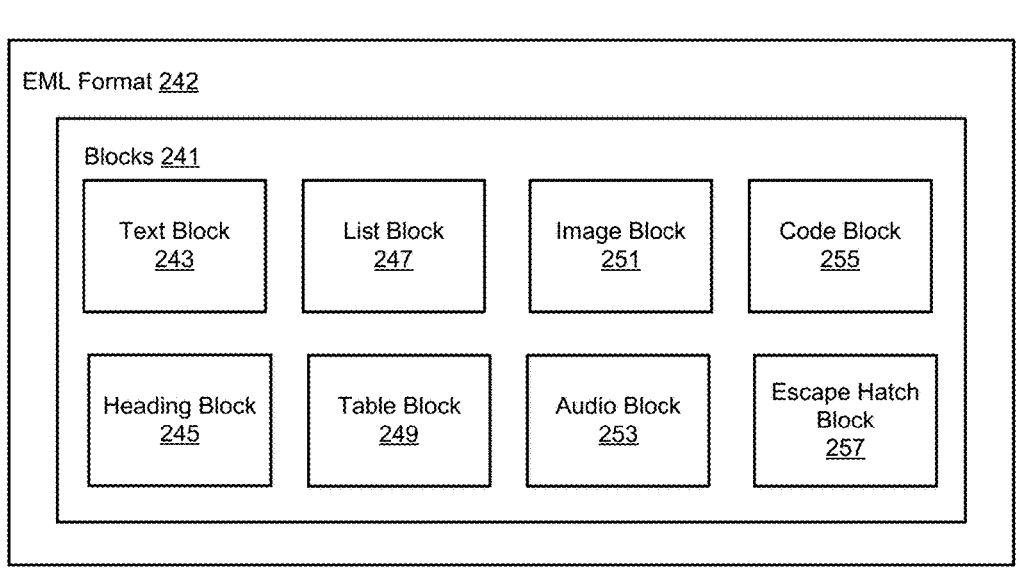
FIG. 3 illustrates a graphical representation of a perspective of an education markup language (EML) format according to an implementation.

FIG. 3 illustrates a graphical representation of a perspective of the EML format 242 according to an implementation. The EML format 242 may define a plurality of blocks 241. The blocks 241 may be the internal representation of the education content 136 that the instructors generate for consumption. A block 241 may be a single unit of information that can be rendered by any platform (e.g., the mobile web 203, the web 205, or the native mobile 207) in a way that is best fitted for that platform). In some examples, the blocks 241 may be considered universal to all three platforms in the sense that the language of EML format 242 does not require presentation information that is specific to a certain platform, but rather the EML format 242 is defined in a way that wells the individual client to render the education content 136 in the best manner. As such, the instructors may be able to focus on the meaning of their content.

In some examples, each block 241 is a section of content that can be inlined. Conversely, if a section of content that cannot be inlined, then it would not be suitable for inclusion within a block 241. Any content that introduces layout (e.g., an image) is separated into a different block 241 to allow clients to create an optimized layout (e.g., the web 205 may right-align an image, while the mobile web 205 may center-align the same image). Any block 241 that has incompatible requirements with content that otherwise could have been inlined should be separated out into a different block 241. For example, if links could not be surrounded by rich text, the links would have to be their own block 241, separate from the text block 241.

The plurality of blocks 241 include a text block 243, a heading block 245, a list block 247, a table block 249, an image block 251, an audio block 253, a code block 255, and an escape hatch block 257. In some examples, the plurality of blocks 241 may include a video block specifying a video file. In some examples, the plurality of blocks 241 may include other types of blocks.

The text block 243 may specify regular text with restricted formatting options such that one or more formatting options that normally would be available in HTML is not available in the EML format 242. In some examples, the text block 243 includes text with a limited set of HTML formatting tags. In some examples, the limited set of HTML formatting tags includes the following: strong (bold), emphasis <em> (italics), underline, strikethrough, a (text only), subscript, and superscript. In some examples, the text block 243 includes math expressions. In some examples, the text block 243 may include math expressions delimited by either $$, \(\) (or inline equations) or \[\] (for block equations). Also, the text block 243 may specify one or more inline links which can be used to link to an internal resource (e.g., internal to the online education platform 102) or an external page (e.g., external to the online education platform 102). Also, with respect to the text, the text block 243 may only allow a limited set of font color and sizes. Table 1 below is an example of a text block 243 written in the EML format 242.

TABLE 1

| (Text Block 243) | |
|---|---|
| EML Format 242 | Rendered by Client |
| <text><br>  <strong>bold</strong>example<br></text> | This is a bold example |
| <text hasMath="true"><br>  This is $$x^2$$<br></text> | This is $x^2$ |
| <text><br>  <strong>bold</strong>example from <a Href="http://www.coursera.org">Coursera</a><br></text> | This is a bold example from Coursera. |

In some examples, the EML format 242 is the language in which the blocks 241 are written. In some examples, the EML format 242 is XML (or substantially XML). In some examples, the EML format 242 defines a restricted set of XML tags (e.g., with restricted attributes) and one or more education-custom tags. For example, each block 241 corresponds to a different type of content and is restricted in the sense that certain features are not allowed. As a result, native rendering on mobile and consistent design across web and mobile platforms are enabled by using the EML-designed blocks 241.

The heading block 245 may specify a header. In some examples, the heading block 245 is similar to <h1>, <h2>, and <h3> HTML tags. The heading block 245 may be capable of Rich text including math expressions. In some examples, the heading block 245 does not handle links. The heading blocks 245 may specify one of a plurality of levels (e.g., levels, 1, 2, or 3), and has an attribute that can specify math (e.g., has math="true" or "false"). Table 2 is an example of a heading block 245 written in the EML format 242.

TABLE 2

| (Heading Block 245) | |
|---|---|
| EML Format 242 | Rendered by Client |
| <heading level="1"><br>This is a heading example<br><heading level="1" hasMath='true'><br>Chapter 1: \$\$x^2\$\$<br></heading> | This is a heading example<br>Chapter 1:$x^2$ |

The list block 247 is a block that is used to specify a list of blocks. In some examples, the list block 247 may identify only one block per list item. In some examples, the list block 247 may have the following attributes: bulletType: numbers (1 . . . 2), alphabets (a . . . b), bullets (*). Table 3 is an example of a List Block 247 written in the EML format 242.

TABLE 3

| (List Block 247) | |
|---|---|
| EML Format 242 | Rendered by Client |
| <list bulletType="numbers"><br><li><br>  <text>textblock1</text><br></li><br><li><br>  <text>textblock2</text><br></li><br><li><br>  <text>textblock5</text><br></li> | 1. Textblock1<br>2. Textblock2<br>3. Textblock5 |

The table block 249 may be a block used to specify tables. In some examples, the table block 249 may be filled out in row-wise order. In some examples, the table block 249 may include the following attributes: rows (total number of rows in the table) and columns (column count in each row in the table). Also, the table block 249 may specify table rows (<tr> </tr> tags can be used to demarcate rows), table headers (<th> </th> tags can be used to contain table header text, and these must be within a <tr> tag, and table headers can be defined with text blocks), and table data (<td> </td> are used to contain table data, and these must be within a <tr> tag, and the table data can be specified with text blocks). Table 4 is an example of a table block 249 written in the EML format 242.

TABLE 4

| (TABLE Block 249) | | |
|---|---|---|
| EML Format 242 | Rendered by Client | |
| <table rows="3" columns ="2"><br><tr><br><th><br> <text><br>  textblock1<br> </text><br></th><br><th><br> <text><br>  Textblock2<br> </text><br></th><br><tr><br><td> | Textblock1<br>Mathtext1<br>Mathtext3 | Textblock2<br>Mathtext2<br>Mathtext4 |

TABLE 4-continued

| (TABLE Block 249) | |
|---|---|
| EML Format 242 | Rendered by Client |
| <text hasMath="true"><br>  Mathtext1<br></text><br>.... | |

The image block 251 is a block used to specify an image. The image block 251 may specify an image by reciting an internal URL. In some examples, the image block 251 may specify an image by only by reciting an internal URL. In some examples, if the specified image is scaled down on a smaller device, then clicking on it will open a bigger preview. In some examples, the image block 251 may specify the URL (Src URL), alternative text (in case the image fails to load), and a caption (optional). Table 5 is an example of an image block 251 written in the EML format 242.

TABLE 5

Figure 25A:
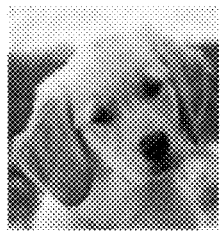
FIG. 25A illustrates an image of an image block according to an implementation.

| (Image Block 251) | |
|---|---|
| EML Format 242 | Rendered |
| <img src="https://src=https://d396qusza40orc.cloudfront.net/hy/images/2-4/a.jpg" alt="deadly pupy" caption="Fig 1.1"/> | Image 251A of FIG. 25A |

The audio block 253 may be a block used to identify audio data. In some examples, the audio block 253 specifies an internally hosted audio file. In some examples, the audio block 253 only allows internally hosted audio files. The audio block 253 may specify the audio URL, alternative text (in case, the audio file does not load), and a caption (option). Table 6 below is an example of an audio block 253 defined with the EML format 242.

TABLE 6

Figure 25B:
FIG. 25B illustrates an audio clip image of an audio block according to an implementation.

| (Audio Block 253) | |
|---|---|
| EML Format 242 | Rendered |
| <audio Src=https://d396qusza40orc.cloudfront.net/hy/exercise%20audio/exercise%202-4/2-4-1.mp3 alt+"Audio1" Caption="Audio Clip 1.1"/> | Audio Clip Image 253A of FIG. 25B<br>Audio clip 1.1 |

The code block 255 may be a differently styled block of text to represent code (e.g., monospaced font). In some examples, the code block 255 may include instructors that include literal newlines and tabs with no other styling (e.g., <strong>). Table 7 is an example of a code block 255 defined with the EML format 242 and an example of a rendered code block 255 by the mobile web 203, the web 205, or the native mobile 207.

TABLE 7

(Code Block 255)

| EML Format 242 | Rendered |
|---|---|
| <code><br>    If let unwrappedData=data? {<br>        Data.parse( );<br>    }<br></code> | If let unwrappedData = data? {<br>    Data.parse( );<br>} |

The escape hatch block 257 may be a block considered as a catch-all block. In some examples, the escape hatch block 257 may be considered an anything-is-allowed HTML block that may be enabled for certain instructors. For example, the escape hatch block 257 does not contain the type of restrictions placed on the other blocks, and, therefore, allows the instructors to be more creative in terms of designing the education content 136. In some examples, a warning may be provided to the instructor that content created with this block may not be displayed on all platforms.

FIG. 4 illustrates a screenshot 400 of the authoring tool 170 of the instructor application 152 that allows the instructor to edit the education content 136 according to an implementation. The authoring tool 170 may define a text editor 423 that allows the instructor to edit the education content 136 by typing text with or without a limited set of stylized features (e.g., underlying, bolding, strike-through, etc.), and inserting and/or defining math expressions, headers, images, videos, audio files, tables, lists, hyperlinks, and/or code blocks. After, the instructor has edited the education content 136, the instructor can activate a review and publish button 421 that proceeds to publish the revised content for the online course 104. For example, the content editor 134 receives the content entered via the text editor 423, and the validation unit 144 performs a formality check on the content entered via the text editor 423. If validated, the education content converter 140 covers the content entered via the text editor 423 (which may be in HTML format) to the EML format 242. For example, the header text may be converted into a heading block 245 (e.g., Table 2), the standard text (with or without math expressions) may be converted into a text block 243 (e.g., Table 1), a table may be converted into a table block 249 (e.g., Table 4), and an image may be converted into an image block (e.g., Table 5), and so forth. As a result, the content provided via the text editor 423 may be provided to the end client or platform within the EML format 242, to be subsequently rendered on the learner's devices.

FIG. 5 illustrates a screenshot 500 of the authoring tool 170 of the instructor application 152 that allows the instructor to edit the education content 136 according to an implementation. FIG. 5 is similar to FIG. 4 except that the authoring tool 170 of FIG. 5 depicts a tool bar 425 providing a plurality of tools to create the education content 136. For example, H1, H2, and H3 provides different levels of headers (which are eventually converted to the heading block 245), as well as other tools (e.g., inserting tables, math expressions, etc.). Also, the authoring tool 170 may specify the type of editing features within the tool bar 425 that is consummate in scope with the restricted scope of the EML format 242. For example, the authoring tool 170 may not permit the recitation of a hyperlink to an audio file external to the online education platform 102 because this type of feature is not supported by the EML format 242.

FIG. 6 illustrates an example of HTML as the first format 138 according to an implementation. For example, FIG. 6 illustrates the HTML version of the education content 136 provided by the instructor in FIG. 4 before the education content 136 is converted into the EML format 242. FIG. 7 illustrates the education content 136 provided by the instructor in FIG. 4 which has been converted to the EML format 242 according to an implementation. FIG. 8 illustrates an example of a screenshot 800 of the education content 136 rendered by the learner application 176 implemented as the native mobile 207 of the computing device 174 according to an implementation. For example, the learner application 176 rendered the education content 136 having the EML format of FIG. 7. FIG. 9 illustrates an example of a screenshot 900 of the education content 136 rendered by the learner application 176 implemented as the web 205 of the computing device 174 according to an implementation. For example, the learner application 176 rendered the education content 136 having the EML format 242 of FIG. 7.

Figure 10:
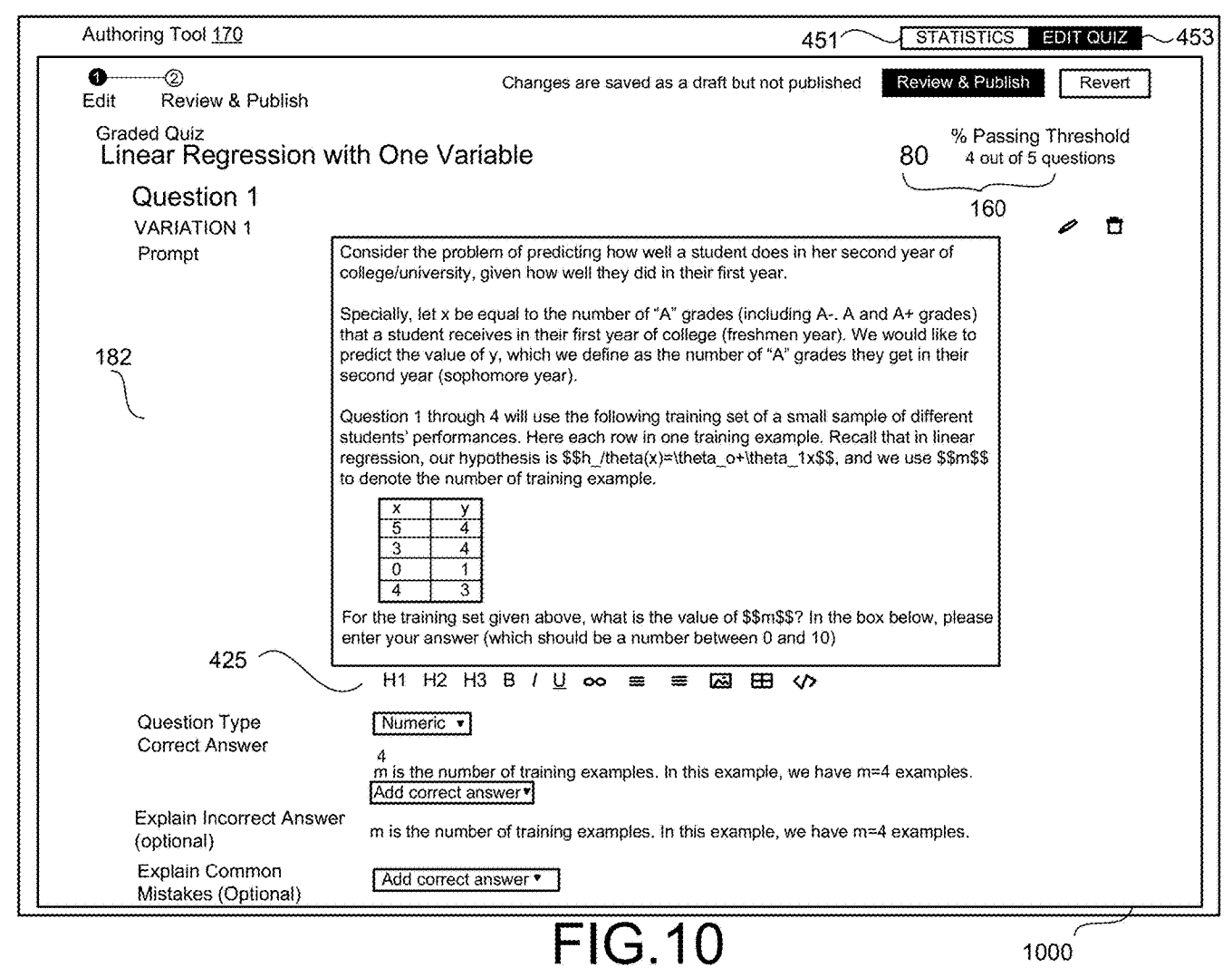

FIG. 10 illustrates a screenshot 1000 of the authoring tool 170 that allows the instructor to change the assessment 182 of the education content 136 in response to feedback according to an implementation. FIG. 11 illustrates a screenshot 1100 of the authoring tool 170 that allows the instructor to change the assessment 182 of the education content 136 in response to feedback according to an implementation. FIG. 12 illustrates a screenshot 1200 of the authoring tool 170 that allows the instructor to change the assessment 182 of the education content 136 in response to feedback according to an implementation. Referring to FIGS. 10-12, using the tool bar 425, the authoring tool 170 permits the instructor to edit the assessment 182. Also, as shown in FIGS. 10 and 12, the authoring tool 170 is integrated with the instructor dashboard 154 in the sense that the instructor can toggle between the authoring tool 170 and the instructor dashboard 154 by selecting an edit quiz button 453 or a statistics button 451 associated with the instructor dashboard 154. Also, the interface of the authoring tool 170 provides a grading metric 160 that indicates the passing threshold for the online course 104. The instructor may obtain a perspective of how well the learners are engaged and performing while viewing the instructor dashboard 154 (e.g., activating the statistics button 451), and then quickly initiate an edit of the assessment by activating the edit quiz button 453.

Figure 13:
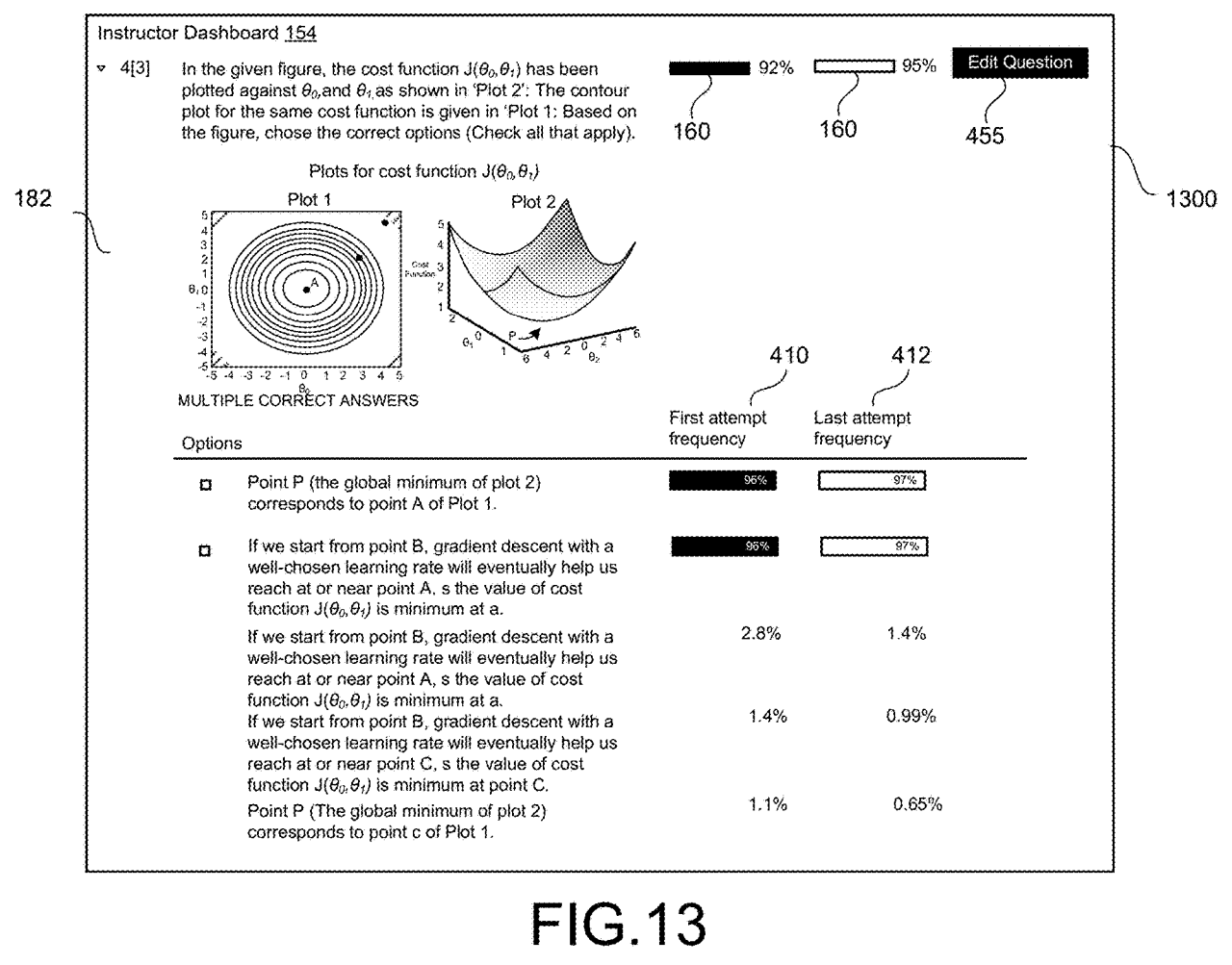

FIG. 13 illustrates a screenshot 1300 of the instructor dashboard 154 according to an implementation. As shown in FIG. 13, the instructor dashboard 154 depicts a portion of the assessment 182, and provides grading metrics 160 associated with a question of the assessment 182. The grading metrics 160 of FIG. 13 depict the percentage of learners first attempting the question, and the percentage of learners last attempting the question. Also, the authoring tool 170 is integrated within the instructor dashboard 154 in the sense that the instructor can initiate an edit of the question of the assessment 182 by activating the edit question button 455 on the instructor dashboard 154.

Figure 14:
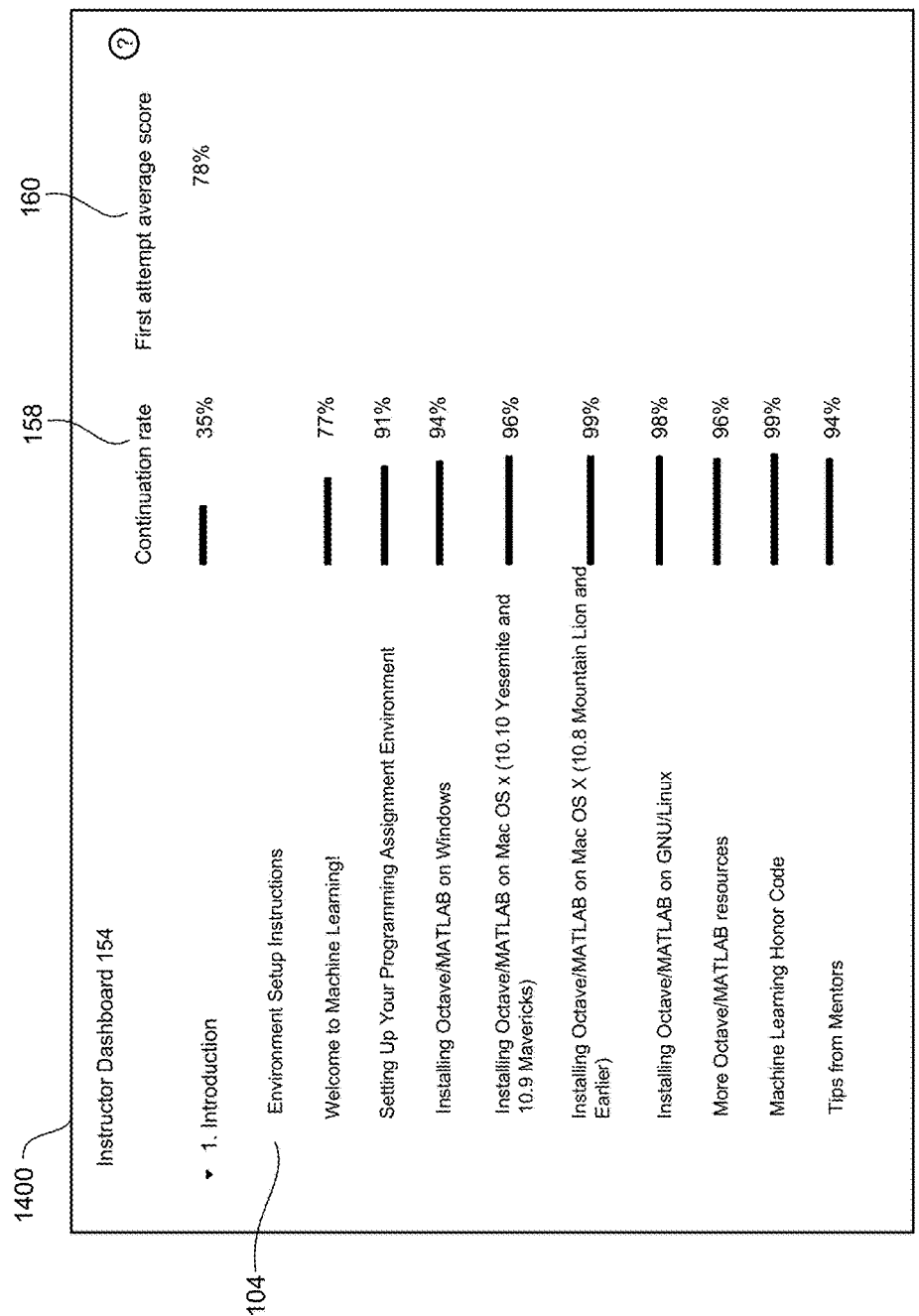
FIG. 14 illustrates another screenshot of the instructor dashboard according to an implementation.
Figure 15:
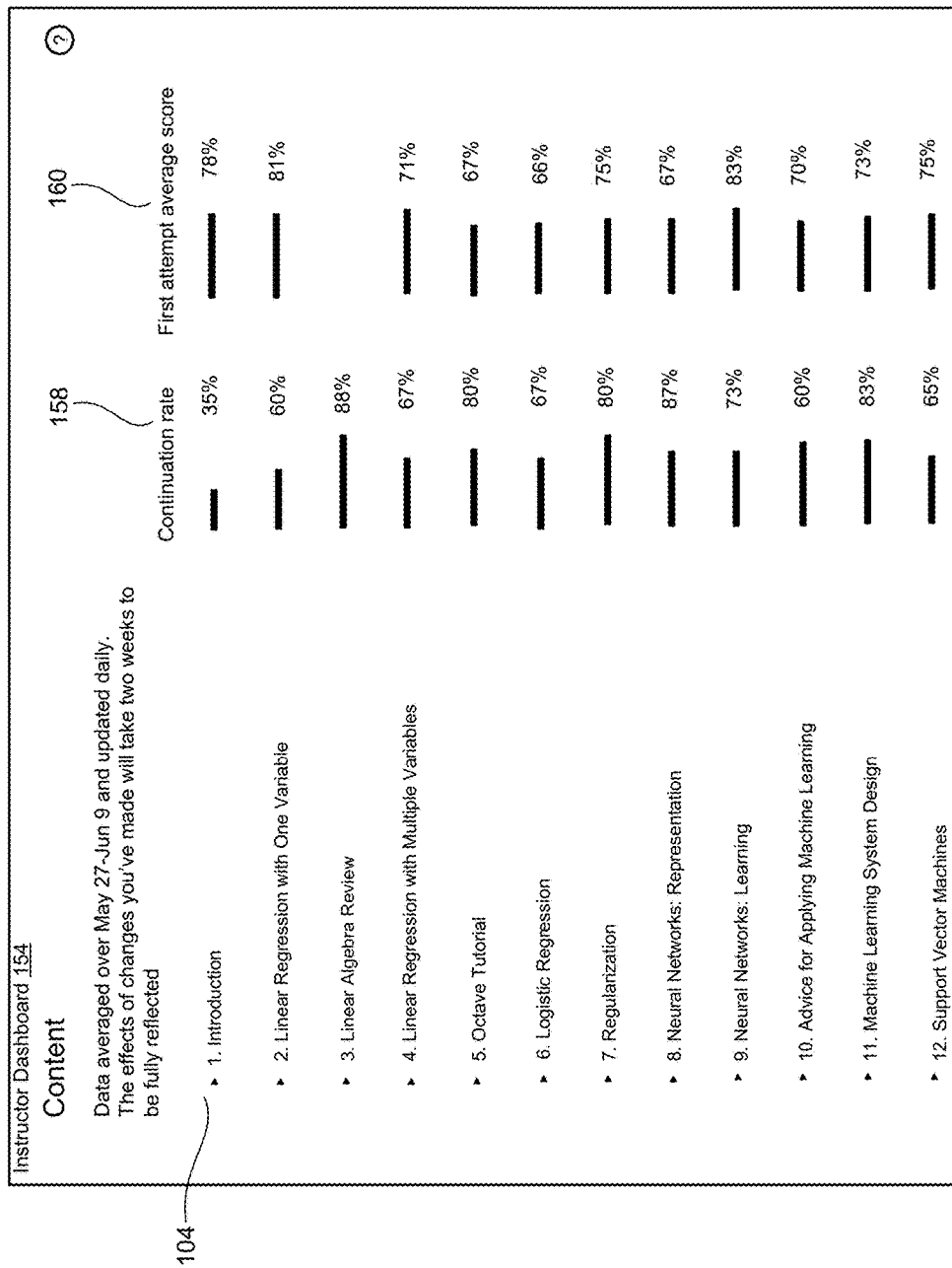
FIG. 15 illustrates another screenshot of the instructor dashboard according to an implementation.

FIG. 14 illustrates a screenshot 1400 of the instructor dashboard 154 depicting the continuation rate and first attempt average score for a portion of the online course 104 according to an implementation. FIG. 15 illustrates a screenshot 1500 of the instructor dashboard 154 depicting the continuation rate and first attempt average score for a portion of the online course 104 according to an implementation. Referring to FIGS. 14-15, the instructor dashboard 154 provides engagement metrics 158 in the form of a continuation rate, and grading metrics 160 in the form of the first attempt average score for a particular part of the online course 104. The continuation rate may indicate the percentage of learners that have completed a particular segment or module of the online course 104.

Figure 16:
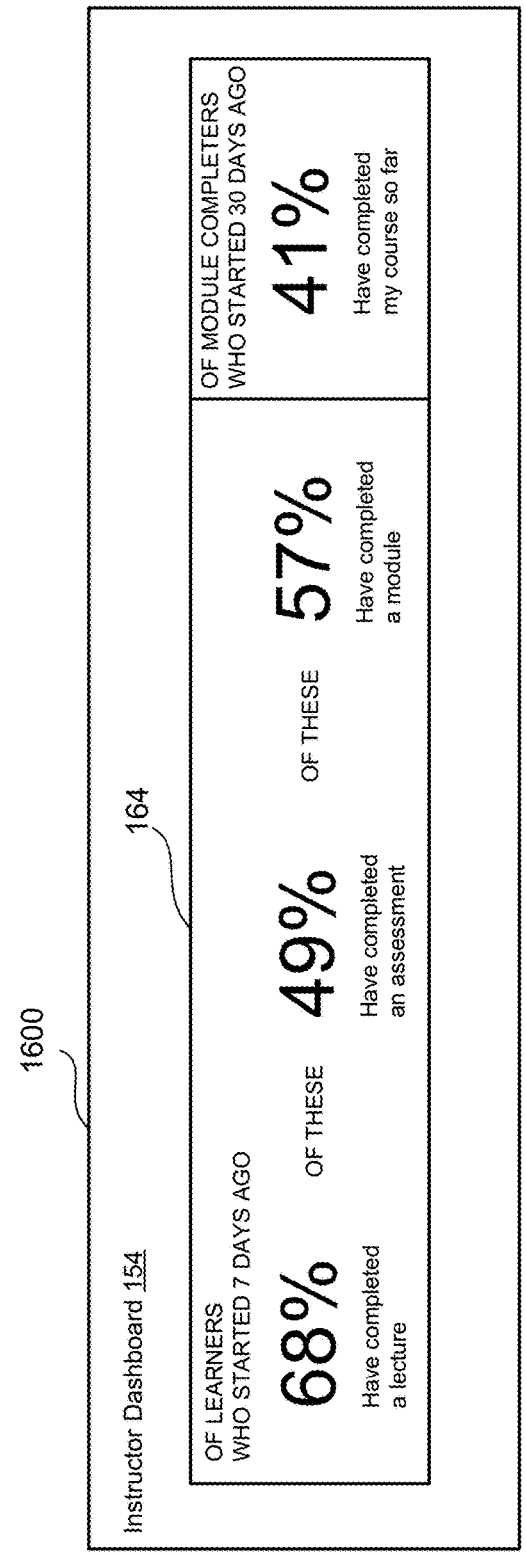
FIG. 16 illustrates a screenshot of the instructor dashboard depicting analytic results according to an implementation.
Figure 17:
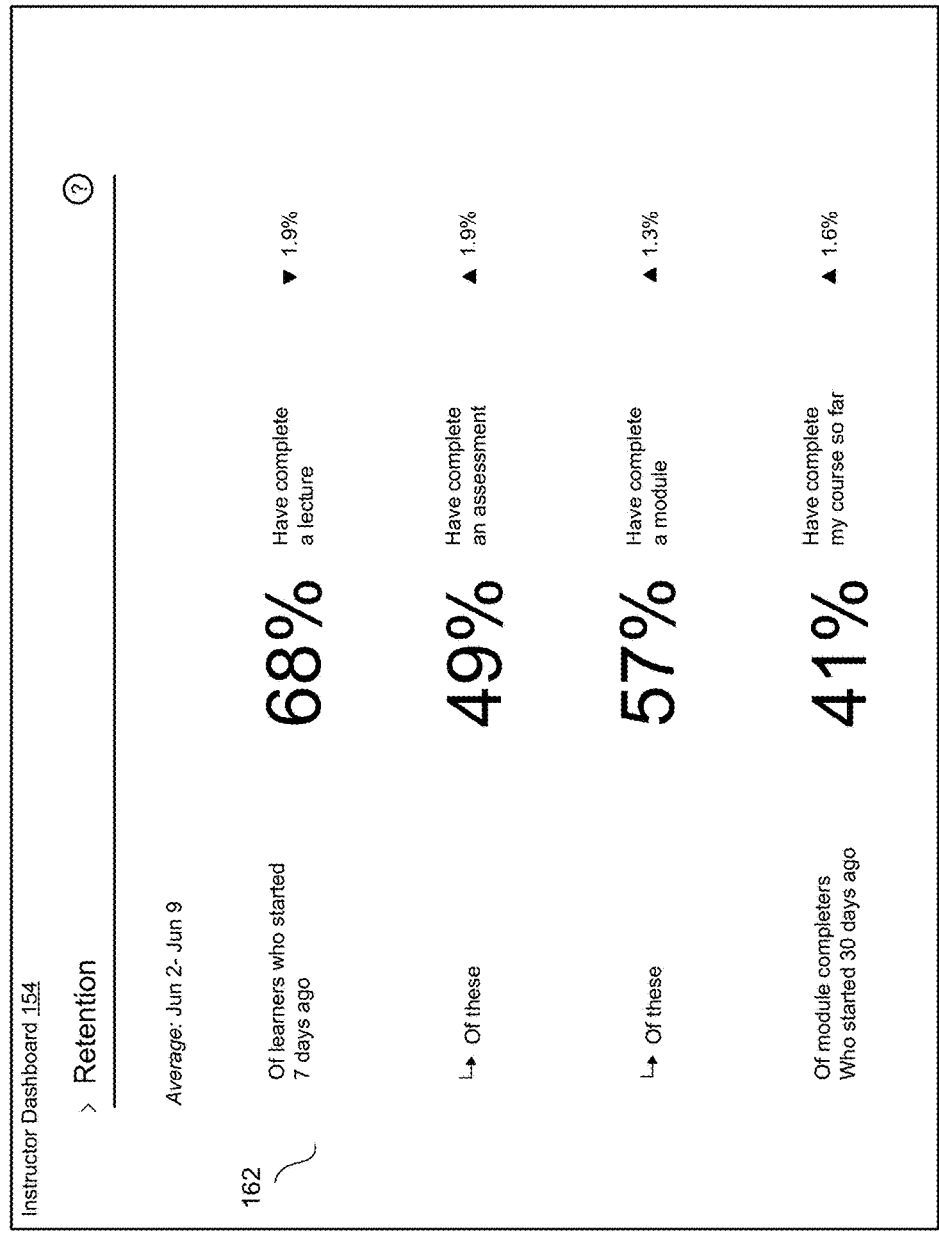
FIG. 17 illustrates another screenshot of the instructor dashboard depicting analytic results according to an implementation.

FIG. 16 illustrates a screenshot 1600 of the instructor dashboard 154 depicting analytic results 164 according to an implementation. FIG. 17 illustrates a screenshot 1700 of the instructor dashboard 154 depicting analytic results 164 according to another implementation. Referring to FIGS. 16-17, the analytic results 164 may include the percentage of learners having completed the lecture 180, and, of these, the percentage of learners having completed an assessment 182, and the percentage of learners have completed a module, and the percentage of learners having completed the online course 104.

Figure 18:
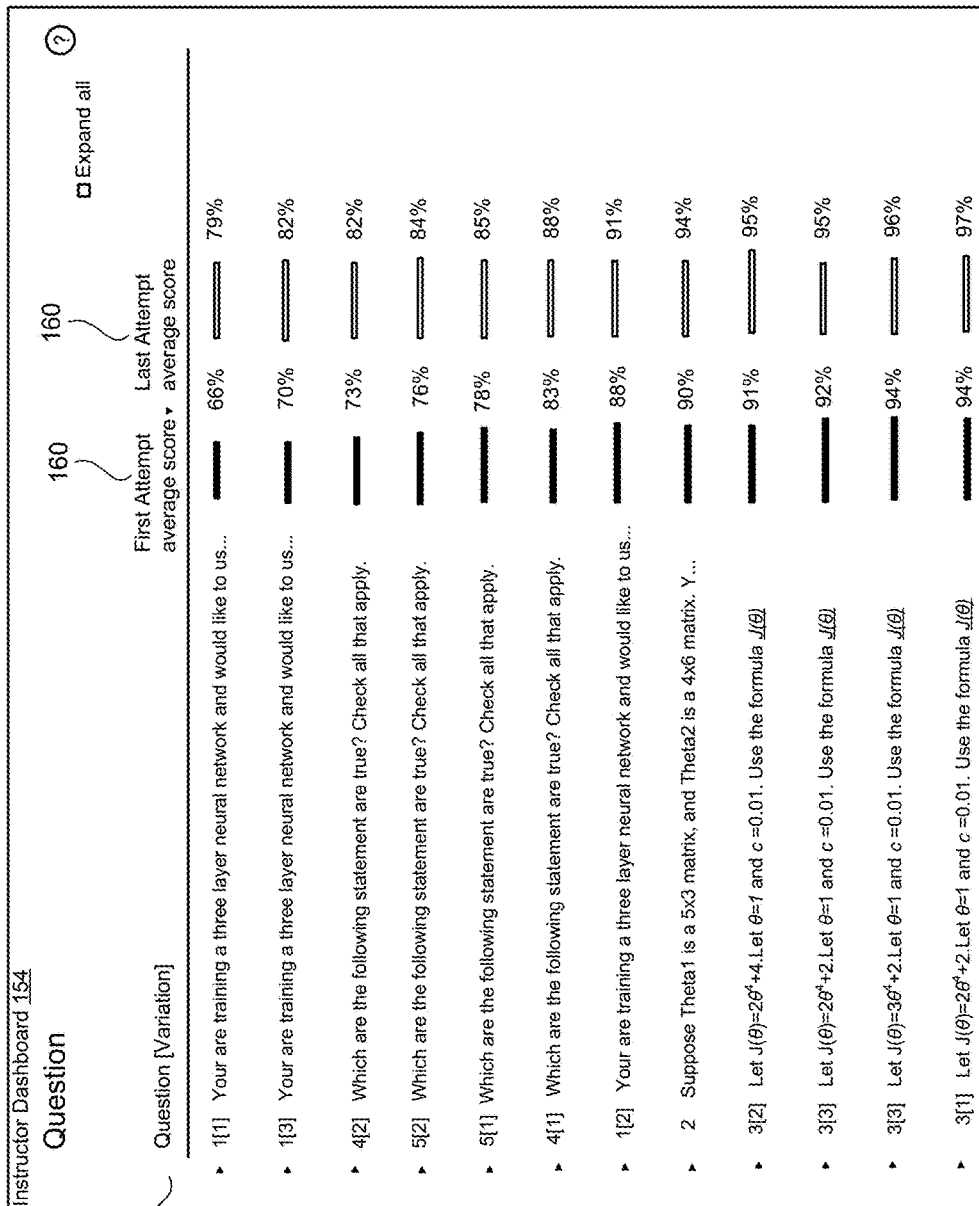
FIG. 18 illustrates a screenshot of the instructor dashboard depicting grading metrics by questions for an assessment according to an implementation.

FIG. 18 illustrates a screenshot 1800 of the instructor dashboard 154 depicting grading metrics 160 by questions for an assessment 182 according to an implementation. The grading metrics 160 of FIG. 18 depict the first attempt average score and the last attempt average score for each question in the assessment 182.

Figure 19:
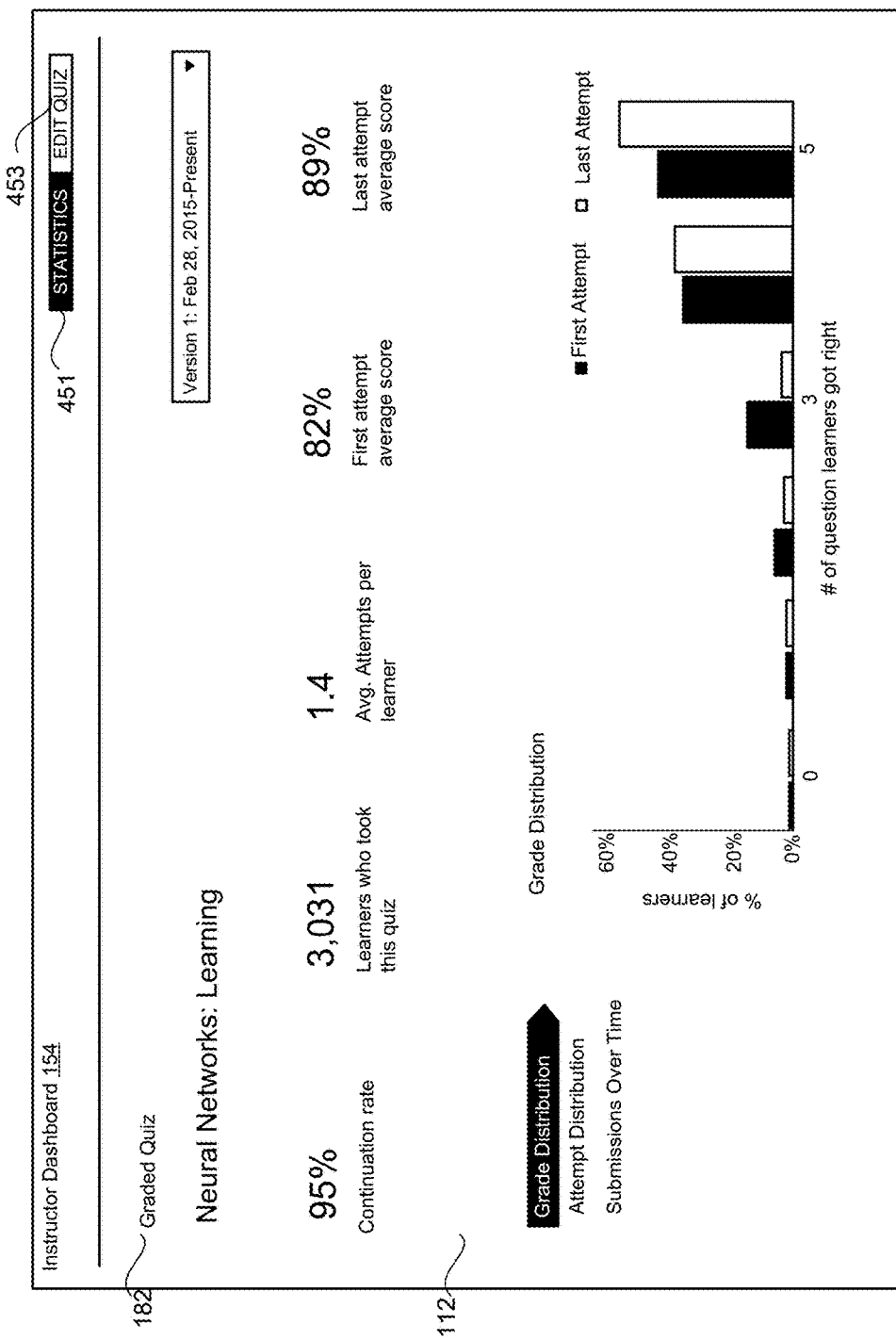
FIG. 19 illustrates a screenshot of the instructor dashboard depicting performance data for an assessment of an online course according to an implementation.

FIG. 19 illustrates a screenshot 1900 of the instructor dashboard 154 depicting various pieces of performance data 112 for an assessment 182 of an online course 104 according to an implementation. Also, the authoring tool 170 is integrated within the instructor dashboard 154 in the sense that the instructor can initiate an edit of the assessment 182 by activating the edit quiz button 453 on the instructor dashboard 154. Also, the instructor can toggle between the authoring tool 170 and the instructor dashboard 154 by selecting the statistics button 451 or the edit quiz button 453. The performance data 112 of FIG. 19 depicts the continuation rate, the amount of learners who took the assessment 182, the average attempts per learner, the first attempt average score, the last attempt average score, and one or more visualizations that represent the grading of the assessment 182.

Figure 20:
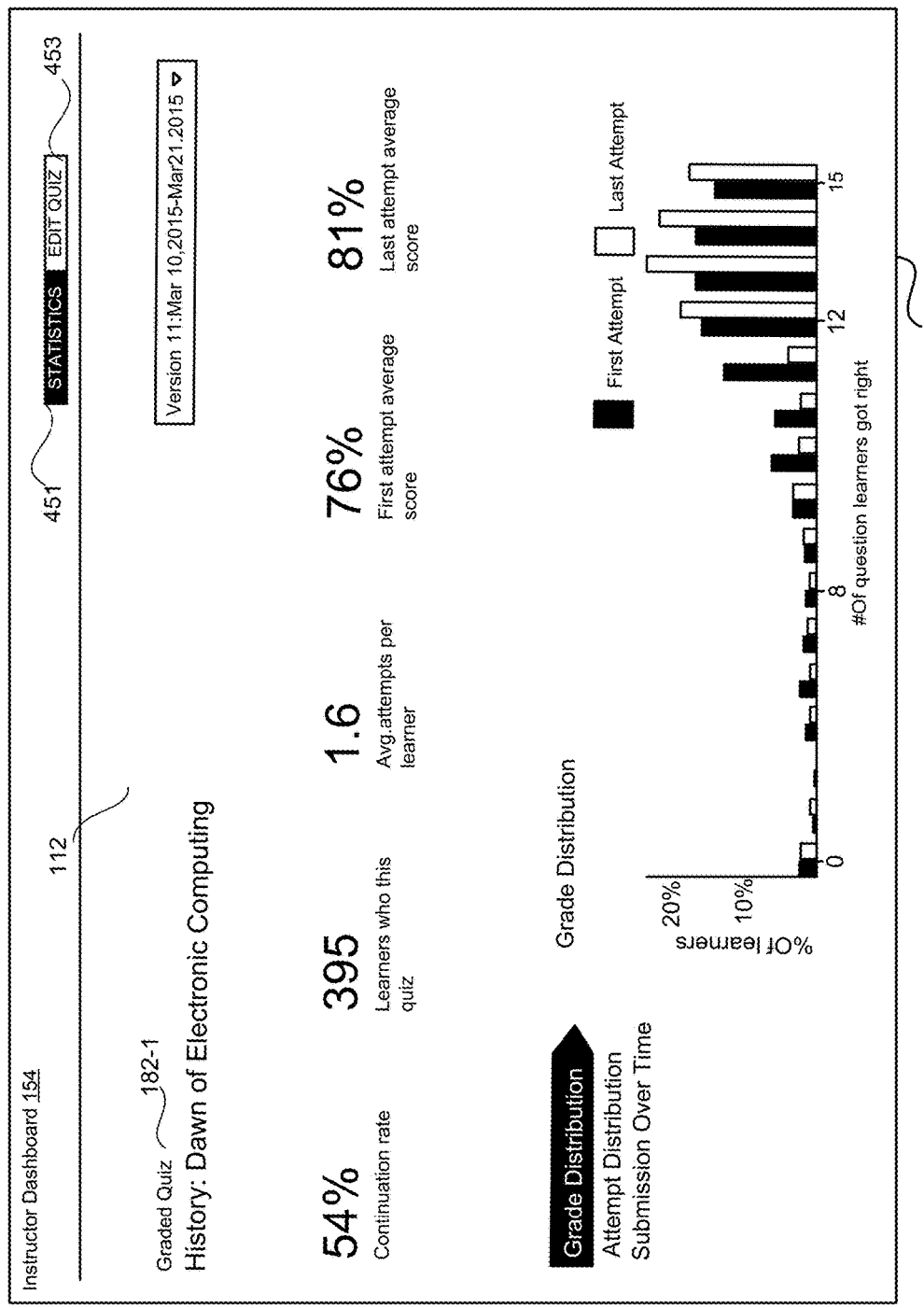
FIG. 20 illustrates a screenshot of the instructor dashboard depicting performance data for a first version assessment of an online course according to an implementation.
Figure 21:
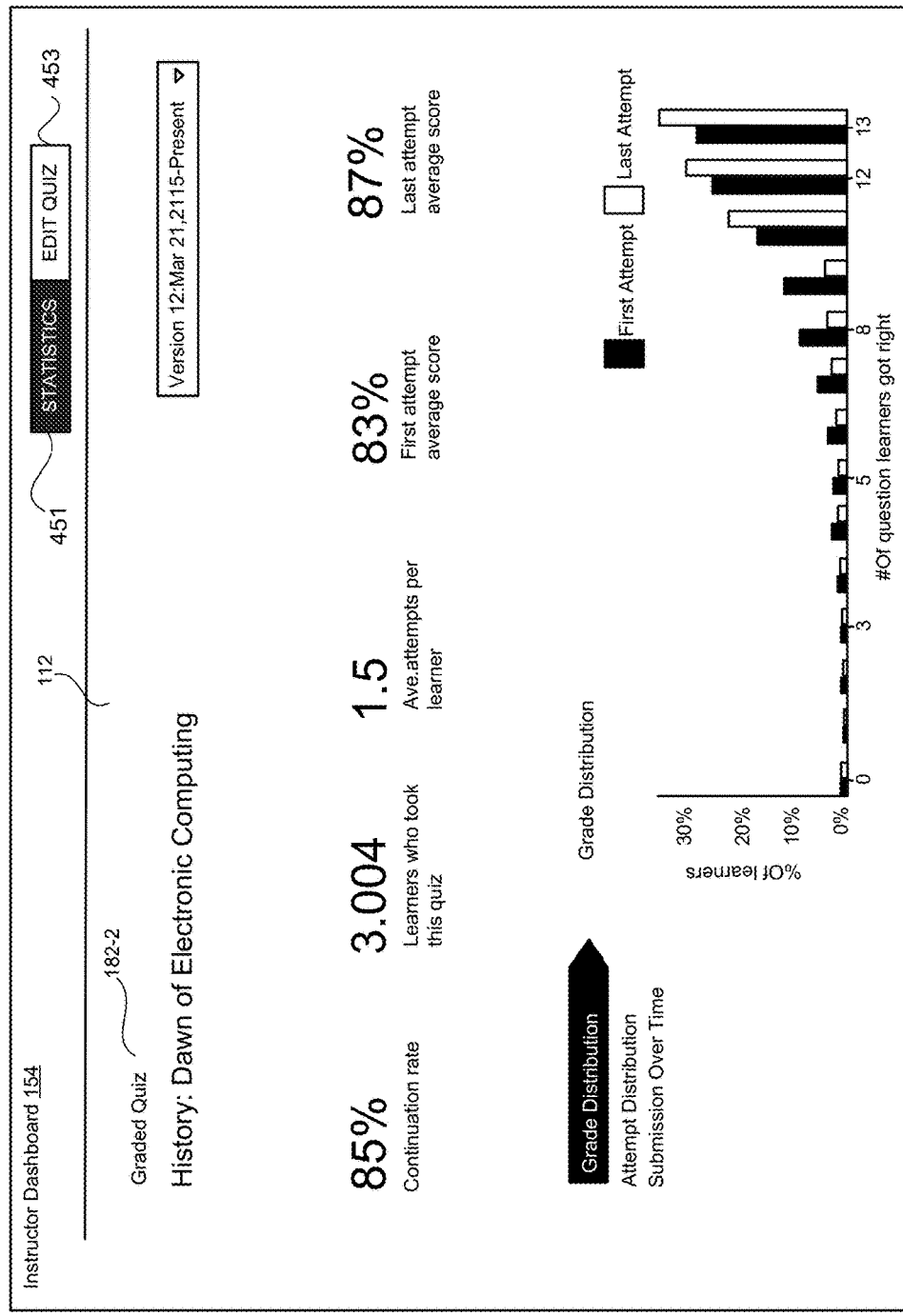
FIG. 21 illustrates a screenshot of the instructor dashboard depicting performance data for a second version assessment of the online course according to an implementation.

FIG. 20 illustrates a screenshot 2000 of the instructor dashboard 154 depicting various pieces of performance data 112 for a first version assessment 182 of an online course 104. FIG. 21 illustrates a screenshot 2100 of the instructor dashboard 154 depicting various pieces of performance data 112 for a second version assessment 182 of the online course 104. Referring to FIGS. 20-21, the authoring tool 170 is integrated within the instructor dashboard 154 in the sense that the instructor can initiate an edit of the first version assessment 182-1 (as well as the second version assessment 182-2) by activating the edit quiz button 453 on the instructor dashboard 154. Also, the instructor can toggle between the authoring tool 170 and the instructor dashboard 154 by selecting the statistics button 451 or the edit quiz button 453. When the statistics button 451 is activated, the instructor dashboard 154 can depict the performance data 112 as including the continuation rate, the amount of learners who took the assessment 182, the average attempts per learner, the first attempt average score, the last attempt average score, and one or more visualizations that represent the grading of the assessment 182 (the first version assessment 182-1 or the second version assessment 182-2).

In one example, the online education platform 102 may provide the first version assessment 182. Then, based on the performance data 112 (and potentially the survey results 114) provided via the instructor dashboard 154 (when the statistics button 451 is activated), the instructor may determine that a particular part of the assessment 182 should be changed. For instance, via the instructor dashboard 154, the instructor may see that the grade distribution is relatively low. Also, via the instructor dashboard 154, the instructor may see that the continuation rate is relatively low. Then, the instructor may institute a change to the assessment 182 to create the second version assessment 182-2, and the change may be carried out by the content editor 134 which converts the education content 136 having the HTML or text format to the EML format 242 that is compatible with the online education platform 102 such that the online education platform 102 can render the second version assessment 182-2 with the EML format 242 across any platform of the learner's computing device (e.g., native mobile, web, mobile web). Then, the instructor can view the performance data 112 associated with the second version assessment 182-2 (e.g., FIG. 21) and determine whether there was an improvement in the performance data 112.

Figure 22:
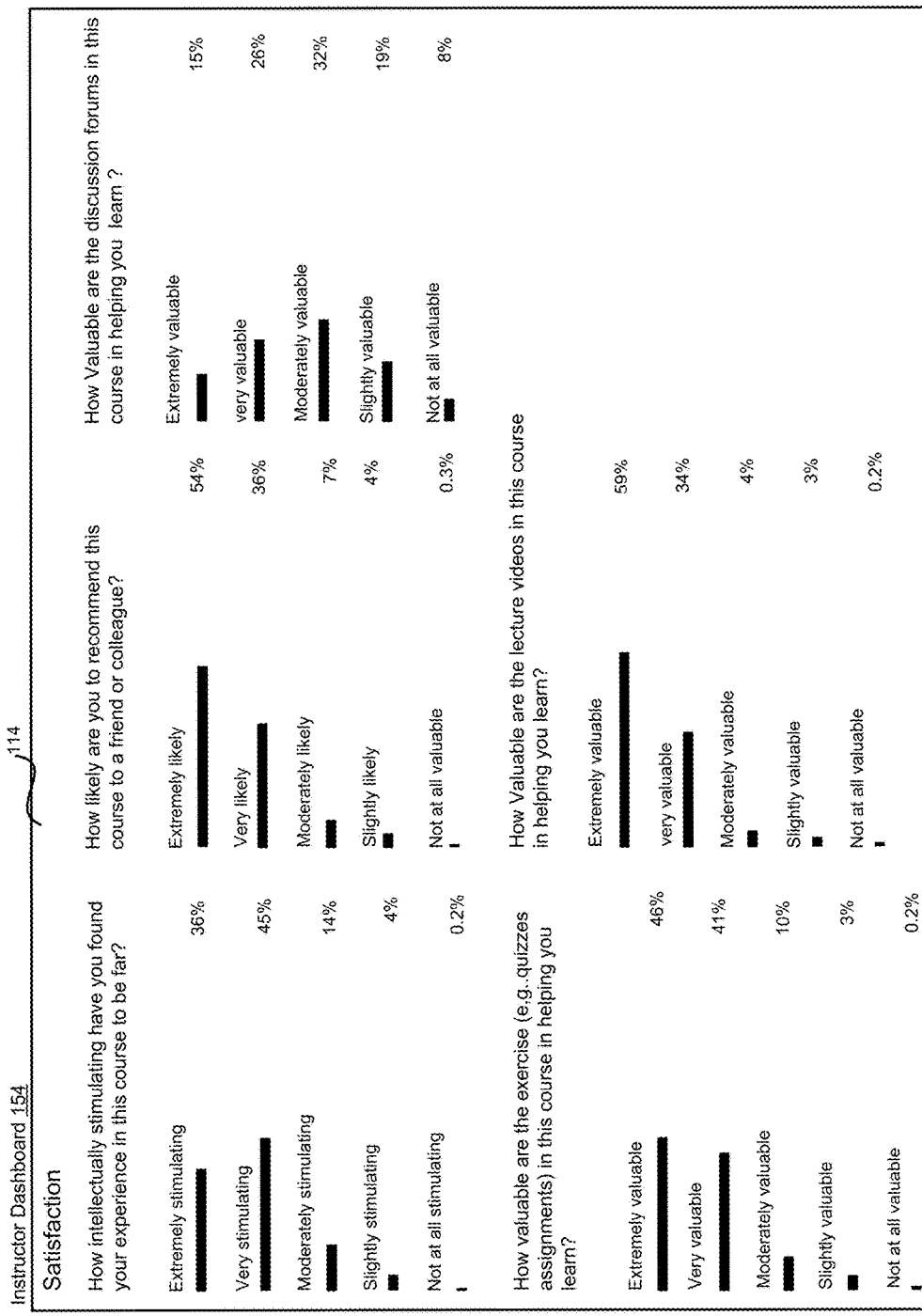
FIG. 22 illustrates a screenshot of the instructor dashboard depicting survey results according to an implementation.

FIG. 22 illustrates a screenshot 2200 of the instructor dashboard 154 depicting the survey results 114 according to an implementation. The survey results 114 of FIG. 22 depict the percentage of students choosing one of the survey answers for a series of topics.

Figure 23:
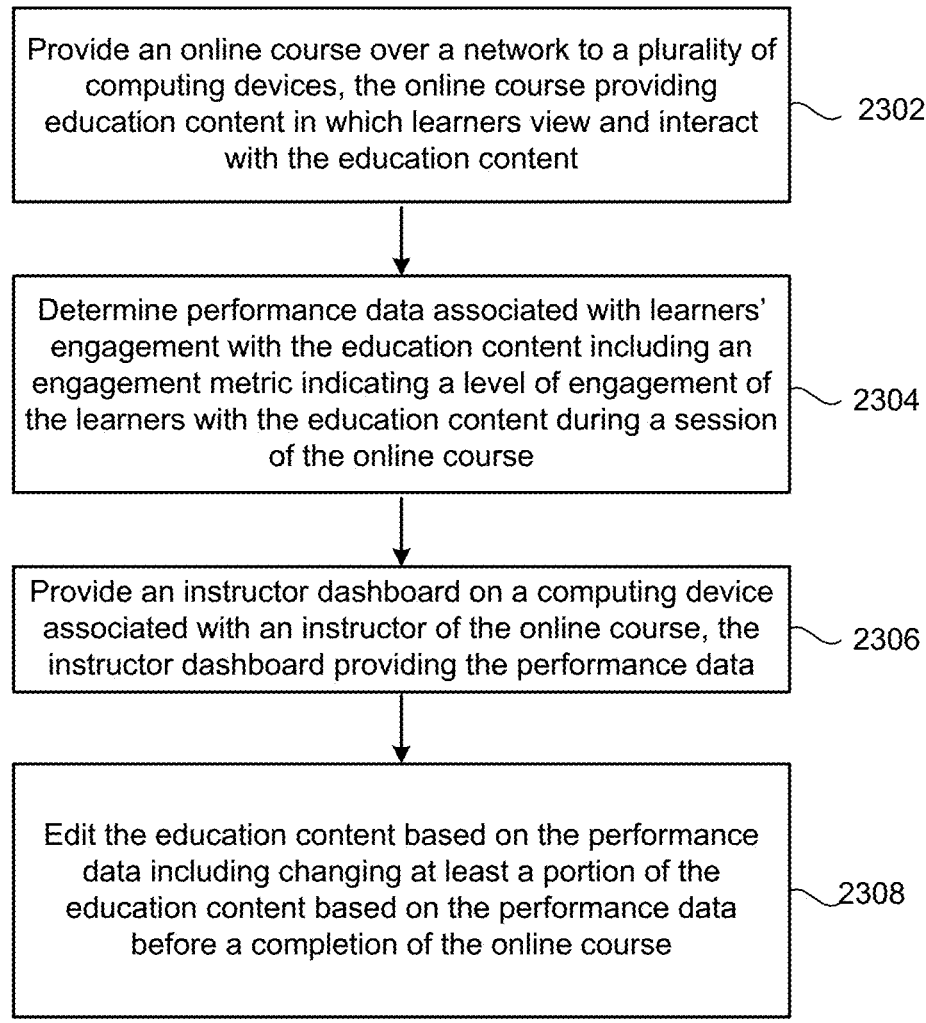
FIG. 23 illustrates a flowchart depicting example operations of the system of FIG. 1 according to an implementation.

FIG. 23 illustrates a flowchart 2300 depicting example operations of the system 100 of FIG. 1 according to an implementation. Although FIG. 23 is illustrated as a sequential, ordered listing of operations, it will be appreciated that some or all of the operations may occur in a different order, or in parallel, or iteratively, or may overlap in time.

An online course may be provided over a network to a plurality of computing devices, where the online course provides education content in which learners view and interface with the education content (2302). For example, the online education platform 102 may be configured to provide the online course 104 over a network to the plurality of computing devices 150, where the online course 104 provides education content 136 in which learners view and interact with the education content 136.

Performance data associated with learners' engagement with the education content may be determined including an engagement metric indicating a level of engagement of the learners with the education content during a session of the online course (2304). For example, the online education platform 102 may include an online course analyzer 110 configured to determine performance data 112 associated with learners' engagement with the education content 136 including an engagement metric 158 indicating a level of engagement of the learners with the education content 136 during a session of the online course 104. In some examples, the online course analyzer 110 includes a learner tracking unit 118 configured to track learners' interactions with the education content 136 during the session of the online course 104, and the online course analyzer 110 is configured to determine the engagement metric 158 based on the learners' interactions.

An instructor dashboard may be provided on a computing device associated with an instructor of the online course, where the instructor dashboard provides the performance data (2306). For example, the online course analyzer 110 may be configured to provide an instructor dashboard 154 on a computing device 150 associated with an instructor of the online course 104.

The education content may be edited based on the performance data including changing at least a portion of the education content based on the performance data before a completion of the online course (2308). For example, the content editor 134 may be configured to edit the education content 136 based on the performance data 112 including changing at least a portion of the education content 136 based on the performance data 112 before a completion of the online course 104. In some examples, the content editor 134 is configured to interface with an authoring tool 170 executing on the computing device 150 associated with the instructor, where the authoring tool 170 is integrated within the instructor dashboard 154 such that the instructor can initiate an edit of the education content 136 while viewing the performance data 112.

In some examples, the online course analyzer 110 includes a grading unit 116 configured to automatically grade assessments 182 taken by the learners, and provide one or more grading metrics 160 via the instructor dashboard 154 based on the graded assessments 182. In some examples, the online education platform 102 is configured to provide a first version of an assessment 182 of the online course 104, and the content editor 134 is configured to change at least a portion of the first version of the assessment 182 to create a second version of the assessment 182. In some examples, the online course analyzer 110 includes an assessment comparator 122 configured to compare the first version of the assessment 182 with the second version of the assessment 182, where the online course analyzer 110 is configured to provide results of the comparison via the instructor dashboard 154.

In some examples, the online course analyzer 110 includes a content evaluator 124 configured to evaluate a quality of the education content 136 based on the performance data 112, and the online course analyzer 110 may include an alerting unit 130 configured to generate an alert based on a quality of at least a portion of the educational content 136 being equal to or below a threshold value.

In some examples, the online education platform 102 is configured to provide the education content 136 with a first feature, and the online education platform 102 is configured to provide the education content 136 with a second feature, where the online course analyzer 110 includes a feature comparator 126 configured to compare performance data 112 having the first feature with performance data 112 having the second feature determine which of the first feature or the second feature is better than the other. In some examples, the online course analyzer 110 is configured to provide a histogram reflecting a grade distribution of an assessment 182 of the online course 104. In some examples, the online course analyzer 110 includes a survey unit 120 configured to provide a first survey to learners of an online class associated with a first school, and provide a second survey to learners of the online class associated with a second school, where the first survey being equivalent to the second survey, and the survey unit 120 may be configured to compare results of the first survey to results of the second survey.

Figure 24:
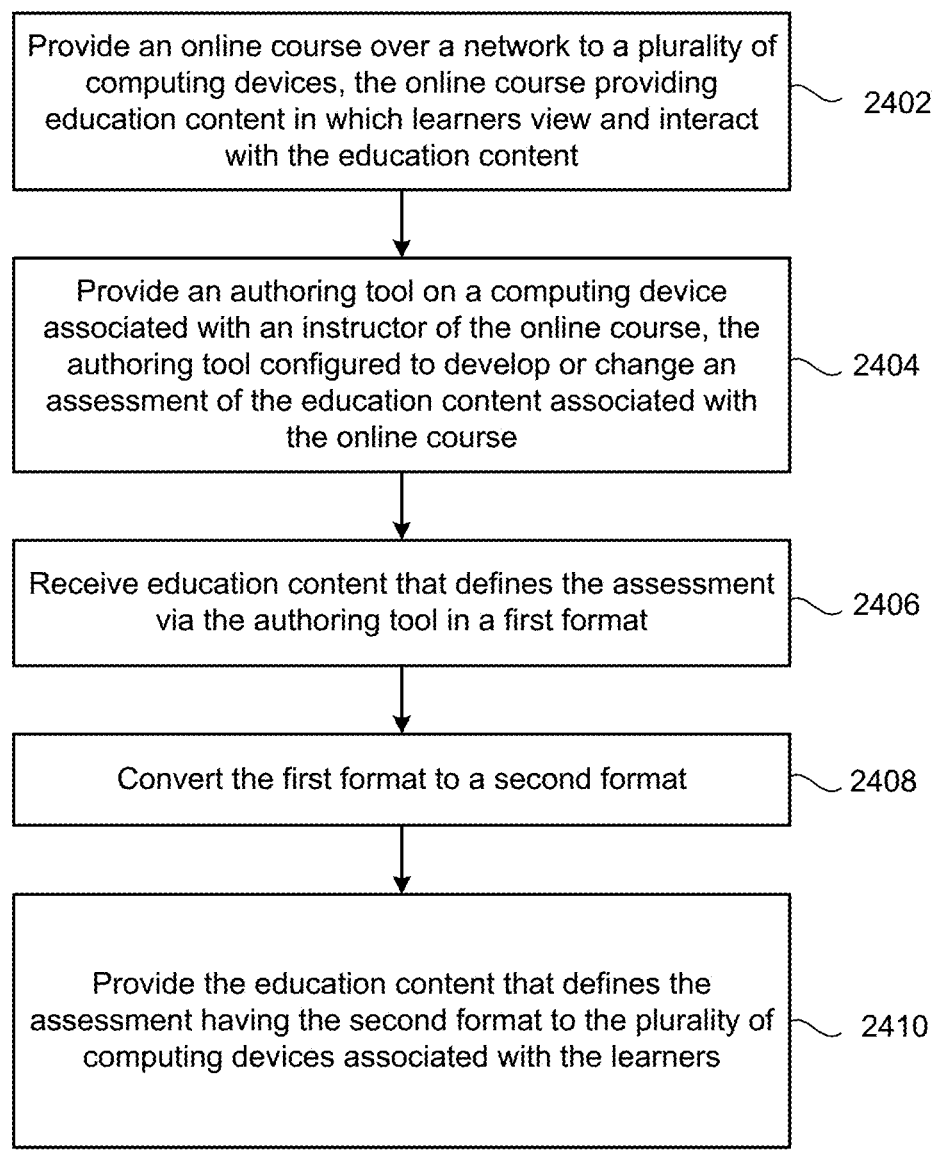
FIG. 24 illustrates a flowchart depicting example operations of the system of FIG. 1 according to another implementation.

FIG. 24 illustrates a flowchart 2400 depicting example operations of the system 100 of FIG. 1 according to an implementation. Although FIG. 24 is illustrated as a sequential, ordered listing of operations, it will be appreciated that some or all of the operations may occur in a different order, or in parallel, or iteratively, or may overlap in time.

An online course may be provided over a network to a plurality of computing devices, where the online course provides education content in which learners view and interact with the education content (2402). For example, the online education platform 102 may be configured to provide the online course 104 over a network to a plurality of computing devices 174, where the online course 104 provides education content 136 in which learners view and interact with the education content 136.

An authoring tool may be provided on a computing device associated with an instructor of the online course, where the authoring tool configured to develop or change an assessment of the education content associated with the online course (2404). For example, the content editor 134 may be configured to provide the authoring tool 170 on the computing device 150 associated with an instructor of the online course 104, where the authoring tool 170 may be configured to develop or change the assessment 182 of the education content 136 associated with the online course 104. In some examples, the instructor can change other portions of the education content 136 such as the lecture 180, and the education data 184. Also, the content editor 134 may provide the authoring tool 190 on the computing devices 174 associated with the learners such that the learners can publish material to the online course 104. In some examples, the authoring tool 170 defines a tool bar 425 identifying a plurality of tools used to edit the education content 136, where the plurality of tools are a restricted set of tools that is consummate in scope with the second format 142 (e.g., the EML format 242).

Education content that defines the assessment may be received via the authoring tool in a first format (2406). For example, the content editor 134 may receive the education content that defines the assessment 182 via the authoring tool 170 in the first format. In some examples, the first format is an HTML format. In some examples, the first format is a text format. In some examples, the first format is a combination of an HTML format and text format.

The first format may be converted to a second format (2408). The content editor 134 may include an education content converter 140 configured to convert the first format 138 to a second format 142. In some examples, the second format 142 is the EML format 242. In some examples, the EML format 242 defines a plurality of blocks 241 using XML, and each of the plurality of blocks 241 correspond to a different type of data content. In some examples, the XML format defines each block of the plurality of blocks 241 with restricted attributes that limits a block 241 to a particular type of data content. In some examples, the education content converter 140 is configured to convert the first format 138 to the second format 142 by converting a hypertext markup language (HTML) format to the EML format 242, where the EML format 242 defines the plurality of blocks 241 with restricted attributes that limit each block 241 to a different type of data content. In some examples, the plurality of blocks 241 include one or more (or any combination of) a text block 243, a heading block 245, list block 247, a table block 249, an image block 251, code block 255, and an audio block 253. In some examples, the plurality of blocks 241 further includes an escape hatch block 257.

The education content that defines the assessment having the second format may be provided to the plurality of computing devices associated with the learners (2410). For example, the content editor 134 may be configured to provide the education content that defines the assessment 182 over the network to the plurality of computing devices 174 associated with the learners.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A non-transitory computer-readable medium storing executable instructions that when executed by at least one processor are configured to implement an online education platform, the online education platform configured to provide an online course over a network to a plurality of learner computing devices, the online course providing education content in which learners view and interact with the education content, the online education platform configured to:

provide an instructor dashboard on a user interface of a client application executable by an instructor computing device associated with an instructor of the online course, the instructor dashboard displaying a graphical visualization of at least one of engagement metrics or grading metrics on the user interface, wherein an authoring tool is integrated with the instructor dashboard, the instructor dashboard displaying a selectable link to initiate an edit of the education content on the user interface that also provides the graphical visualization;

provide the authoring tool on the user interface upon activation of the selectable link, the authoring tool displaying a text editor configured to receive a modification to the education content;

convert the education content received via the text editor to an education markup language (EML) format, the EML format including a restrictive extensible markup language (XML) defining a set of restrictive XML tags, the EML format defining a plurality of blocks, each of the plurality of blocks corresponding to a different type of data content with restricted attributes that limit a block to a particular type of data content such that one or more features are not allowed; and provide, over the network, the education content in the EML format to the plurality of learner computing devices associated with the online course, wherein the EML format is configured to enable native rendering of the education content in a web application, a mobile web application, and a native mobile application executable by the plurality of learner computing devices.

2. The non-transitory computer-readable medium of claim 1, wherein the online education platform is configured to:
track learners' interactions with the education content during a session of the online course; and
calculate the engagement metrics based on the learners' interactions, the engagement metrics indicating a level of engagement of the learners with the education content during a session of the online course.

3. The non-transitory computer-readable medium of claim 1, wherein the online education platform is configured to:
automatically grade an assessment associated with the online course and provide the grading metrics via the instructor dashboard based on the graded assessment.

4. The non-transitory computer-readable medium of claim 1, wherein the online education platform is configured to:
provide a first version of an assessment associated with the online course;
change at least a portion of the first version of the assessment to create a second version of the assessment based on information received via the text editor;
programmatically compare the first version of the assessment with the second version of the assessment; and
provide results of the comparison via the instructor dashboard.

5. The non-transitory computer-readable medium of claim 1, wherein the online education platform is configured to:
receive, over the network, performance data associated with learners' engagement with the education content from the plurality of learner computing devices;
evaluate a quality of the education content based on the performance data; and
generate an alert based on a quality of at least a portion of the educational content being equal to or below a threshold value.

6. The non-transitory computer-readable medium of claim 1, wherein the graphical visualization includes a histogram reflecting a grade distribution of an assessment associated with the online course.

7. The non-transitory computer-readable medium of claim 1, wherein the EML format is universal to a mobile web platform, a web platform, and a native mobile platform such that the blocks defined by the EML format does not require presentation information that is specific to the mobile web platform, the web platform, or the native mobile platform.

8. The non-transitory computer-readable medium of claim 1, wherein each block of the plurality of blocks is a separate section configured to be inlined.

9. A method for implementing an online education platform that provides an online course over a network to a plurality of learner computing devices in which learners view and interact with education content of the online course, the method comprising:
providing, by the at least one processor, an instructor dashboard on a user interface of a client application executable by an instructor computing device associated with an instructor of the online course, the instructor dashboard displaying a graphical visualization of at least one of engagement metrics or grading metrics on the user interface, wherein an authoring tool is integrated with the instructor dashboard, the instructor dashboard displaying a selectable link to initiate an edit of the education content on the user interface that also provides the graphical visualization;
providing, by the at least one processor, the authoring tool on the user interface upon activation of the link, the authoring tool displaying a text editor configured to receive a modification to the education content;
converting, by the at least one processor, the education content received via the text editor to an education markup language (EML) format, the EML format including a restrictive extensible markup language (XML) defining a set of restrictive XML tags, the EML format defining a plurality of blocks, each of the plurality of blocks corresponding to a different type of data content with restricted attributes that limit a block to a particular type of data content such that one or more features are not allowed; and
provide, over the network, the education content in the EML format to the plurality of learner computing devices associated with the online course,
wherein the EML format is configured to enable native rendering of the education content in a web application, a mobile web application, and a native mobile application executable by the plurality of learner computing devices.

10. The method of claim 9, further comprising:
tracking, by the at least one processor, learners' interactions with the education content during a session of the online course; and
calculating, by the at least one processor, the engagement metrics based on the learners' interactions, the engagement metrics indicating a level of engagement of the learners with the education content during a session of the online course.

11. The method of claim 9, further comprising:
automatically grading, by the at least one processor, an assessment associated with the online course; and
providing, by the at least one processor, the grading metrics via the instructor dashboard based on the graded assessment.

12. A system comprising:
at least one processor; and
a non-transitory computer-readable medium configured to store executable instructions that when executed by the at least one processor are configured to implement an online education platform configured to provide an online course over a network to a plurality of learner computing devices, the online course providing education content in which learners view and interact with the education content, the online education platform configured to:
provide an instructor dashboard on a user interface of a client application executable by an instructor computing device associated with an instructor of the online course, the instructor dashboard displaying a graphical visualization of at least one of engagement metrics or grading metrics, wherein an authoring tool is integrated with the instructor dashboard, the instructor dashboard displaying a selectable link to initiate an edit of the education content on the user interface that also provides the graphical visualization;
provide the authoring tool on the user interface upon activation of the selectable link, the authoring tool displaying a text editor configured to receive a modification to the education content;
convert the education content received via the text editor from a hypertext markup language (HTML) to an education markup language (EML) format, the EML format including a restrictive extensible markup language (XML) defining a set of restrictive XML tags, the EML format defining a plurality of blocks, each of the plurality of blocks corresponding to a different type of data content with restricted attributes that limit a block to a particular type of data content such that one or more features are not allowed; and provide, over the network, the education content in the EML format to the plurality of learner computing devices associated with the online course, wherein the EML format is configured to enable native rendering of the education content in a web application, a mobile web application, and a native mobile application executable by the plurality of learner computing devices.

13. The system of claim 12, wherein the authoring tool defines a tool bar identifying a plurality of tools used to edit the education content, the plurality of tools being a restricted set of editing tools that allows content only permitted by the restricted attributes of the EML format.

14. The system of claim 12, wherein the plurality of blocks include a text block, heading block, list block, a table block, an image block, code block, and an audio block.

15. The method of claim 14, wherein the plurality of blocks are defined by the restrictive XML format that restricts the text block to text and the table block to tables.

* * * * *